US011658586B2

(12) United States Patent
Xiong et al.

(10) Patent No.: US 11,658,586 B2
(45) Date of Patent: May 23, 2023

(54) WEARABLE TRIBOELECTRIC GENERATOR FOR ENERGY HARVESTING

(71) Applicant: NANYANG TECHNOLOGICAL UNIVERSITY, Singapore (SG)

(72) Inventors: Jiaqing Xiong, Singapore (SG); Pooi See Lee, Singapore (SG); Meng-Fang Lin, Singapore (SG)

(73) Assignee: Nanyang Technological University, Singapore (SG)

( * ) Notice: Subject to any disclaimer, the term of this patent is extended or adjusted under 35 U.S.C. 154(b) by 816 days.

(21) Appl. No.: 16/499,189

(22) PCT Filed: Mar. 28, 2018

(86) PCT No.: PCT/SG2018/050150
§ 371 (c)(1),
(2) Date: Sep. 27, 2019

(87) PCT Pub. No.: WO2018/182521
PCT Pub. Date: Oct. 4, 2018

(65) Prior Publication Data
US 2020/0106371 A1    Apr. 2, 2020

(30) Foreign Application Priority Data

Mar. 28, 2017    (SG) ............... 10201702507W

(51) Int. Cl.
*H02N 1/04*     (2006.01)
*D06M 11/83*    (2006.01)
(Continued)

(52) U.S. Cl.
CPC .............. *H02N 1/04* (2013.01); *D06M 11/83* (2013.01); *D06M 15/07* (2013.01); *D06M 23/00* (2013.01);
(Continued)

(58) Field of Classification Search
CPC ........ D06M 11/00; D06M 14/00; H02N 1/04; H02N 2/18; H02N 2/185; H02N 2/186;
(Continued)

(56) References Cited

U.S. PATENT DOCUMENTS

2014/0246950 A1* 9/2014 Wang ................ H02N 1/04
                                              310/310
2016/0218640 A1 7/2016 Wang et al.
(Continued)

FOREIGN PATENT DOCUMENTS

CN      105099260 A      11/2015
EP         3131195 A1 *  2/2017 ............... H02N 1/04
(Continued)

OTHER PUBLICATIONS

Chartrand, Ariane; Lavoie, Jean-Michel; Huneault, Michel A. "Surface Modification of microcrystalline cellulose (MCC0 and its application in LDPE-based composites"; 2016 Wiley Periodicals, J. Appl. Polym Sce 2017, DPI:10.1002/APP.44348 (Year: 2016).*
(Continued)

*Primary Examiner* — Jennifer A Steele
(74) *Attorney, Agent, or Firm* — Seed IP Law Group LLP

(57) ABSTRACT

The present disclosure relates to a wearable water triboelectric generator, wherein the water triboelectric generator comprises a first substrate having a first surface and a second surface, wherein the first surface and the second surface are opposing to each other; and wherein the first surface comprises a modified hydrophobic surface comprising a coating of hydrophobic cellulose oleoyl ester nanoparticles. There is also provided a wearable dual mode water and contact triboelectric generator comprising said water triboelectric generator and a contact triboelectric generator, wherein the water triboelectric generator and the contact triboelectric generator are arranged such that the first substrate of the
(Continued)

water triboelectric generator completely surrounds or encapsulates the contact triboelectric generator.

21 Claims, 14 Drawing Sheets

(51) Int. Cl.
　　　*D06M 15/07*　　(2006.01)
　　　*D06M 23/00*　　(2006.01)
　　　*D06M 101/06*　　(2006.01)
　　　*D06M 101/12*　　(2006.01)
　　　*D06M 101/32*　　(2006.01)
　　　*D06M 101/34*　　(2006.01)

(52) U.S. Cl.
　　　CPC .... *D06M 2101/06* (2013.01); *D06M 2101/12* (2013.01); *D06M 2101/32* (2013.01); *D06M 2101/34* (2013.01); *D06M 2200/12* (2013.01)

(58) Field of Classification Search
　　　CPC ...... H02N 1/004; D03D 15/67; D03D 1/0088; D03D 1/00; D03D 15/00; D03D 15/242; A61B 2562/0209; A61B 5/6804; Y10S 242/906; A41D 1/002; B32B 2250/03; B32B 2264/105; B32B 2457/202; B32B 27/18; B32B 27/306; B32B 23/08; B32B 23/16; B32B 23/20; B32B 2307/206; B32B 2307/42; B32B 2307/54; B32B 2457/00; B32B 2551/00; B32B 27/00; B32B 27/08; B32B 27/14; B32B 27/28; B32B 27/30; B32B 27/308; B32B 27/325; B32B 27/365; B32B 3/30; B32B 5/16
　　　See application file for complete search history.

(56) References Cited

U.S. PATENT DOCUMENTS

2017/0359001 A1\* 12/2017 Wang ................. C23C 16/045
2018/0013358 A1\* 1/2018 Turng ...................... H02N 1/04

FOREIGN PATENT DOCUMENTS

WO　　WO-2015154693 A1 \* 10/2015　............... H02N 1/04
WO　　　2016/197146 A1　12/2016

OTHER PUBLICATIONS

Henry, "The role of asymmetric rubbing in the generation of static electricity"; Br. J. Appl. Phys. 4 S31; (Year: 1953).\*
Chartrand et al., "Surface modification of microcrystalline cellulose (MCC) and its application in LDPE-based composites," *Appl. Polym. Sci.* 134:44348, 2017 (9 pages).
Cheng et al., "Increase Output Energy and Operation Frequency of a Triboelectric Nanogenerator by Two Grounded Electrodes Approach," *Adv. Funct. Mater.* 24(19):1-7, 2014.
Cheng et al., "Pulsed Nanogenerator with Huge Instantaneous Output Power Density," *ACS Nano* 7(8):7383-7391, 2013.
Cheng et al., "Simultaneously Harvesting Electrostatic and Mechanical Energies from Flowing Water by a Hybridized Triboelectric Nanogenerator," *ACS Nano* 8(2):1932-1939, 2014.
Corrales et al., "Chemical modification of jute fibers for the production of green-composites," *Journal of Hazardous Materials* 144:720-735, 2007.
Fan et al., "Flexible triboelectric generator!" *Nano Energy* 1:328-334, 2012.
Geissler et al., "Superhydrophobic surfaces fabricated from nano- and microstructured cellulose stearoyl esters," *Chem. Commun.* 49:4962-4964, 2013.

Li et al., "A nanowire based triboelectric nanogenerator for harvesting water wave energy and its applications," *APL Materials* 5:074104, 2017 (7 pages).
Li et al., "Single-electrode-based rotationary triboelectric nanogenerator and its applications as self-powered contact area and eccentric angle sensors," *Nano Energy* 11:323-332, 2015.
Liang et al., "Highly transparent triboelectric nanogenerator for harvesting water-related energy reinforced by antireflection coating," *Scientific Reports* 5:9080, 2015 (7 pages).
Lin et al., "Dual-Mode Triboelectric Nanogenerator for Harvesting Water Energy and as a Self-Powered Ethanol Nanosensor," *ACS Nano* 8(6):6440-6448, 2014.
Lin et al., "Triboelectric Nanogenerator as an Active UV Photodetector," *Adv. Funct. Mater.* 24(19):1-7, 2014.
Lin et al., "Water-Solid Surface Contact Electrification and its Use for Harvesting Liquid Wave Energy," *Angew. Chem. Int. Ed.* 52:1-6, 2013.
Liu et al., "A triboelectric textile template by a three-dimensionally penetrated fabric," *J. Mater. Chem. A* 4:6077-6083, 2016.
Nguyen et al., "Effect of humidity and pressure on the triboelectric nanogenerator," *Nano Energy* 2:604-608, 2013.
Peng et al., "A comparative guide to controlled hydrophobization of cellulose nanocrystals via surface esterification," *Cellulose* 23:1825-1846, 2016.
Pu et al., "Wearable Power-Textiles by Integrating Fabric Triboelectric Nanogenerators and Fiber-Shaped Dye-Sensitized Solar Cells," *Adv. Energy Mater.* 6(20):1601048, 2016 (9 pages).
Pu et al., "Wearable Self-Charging Power Textile Based on Flexible Yarn Supercapacitors and Fabric Nanogenerators," *Adv. Mater.* 28(1):1-8, 2015.
Ravelo et al., "Demonstration of the triboelectricity effect by the flow of liquid water in the insulating pipe," *Journal of Electrostatic* 69:473-478, 2011.
Shi et al., "A single-electrode wearable triboelectric nanogenerator based on conductive & stretchable fabric," *IEEE 29th International Conference on Micro Electric Mechanicals Systems (MEMS)*, pp. 1228-1231, 2016.
Takahashi, "Measurement of Electric Charge of Cloud Droplets, Drizzle, and Raindrops," *Reviews of Geophysics and Space Physics* 11(4):903-924, 1973.
Wang et al., "Triboelectric Nanogenerators as New Energy Technology for Self-Powered Systems and as Active Mechanical and Chemical Sensors," *ACS Nano* 7(11):9533-9557, 2013.
Wu et al., "Wearable Electricity Generators Fabricated Utilizing Transparent Electronic Textiles Based on Polyester/Ag Nanowires/Graphene Core-Shell Nanocomposites," *ACS Nano* 10:6449-6457, 2016.
Xiong et al., "Wearable All-Fabric-Based Triboelectric Generator for Water Energy Harvesting," *Adv. Energy Mater.* 7(21):1701243, 2017 (10 pages).
Yang et al., "A Fully Verified Theoretical Analysis of Contact-Mode Triboelectric Nanogenerators as a Wearable Power Source," *Adv. Energy Mater.* 6:1600505, 2016 (8 pages).
Yang et al., "Single-Electrode-Based Sliding Triboelectric Nanogenerator for Self-Powered Displacement Vector Sensor System," *ACS Nano* 7(8):7342-7351, 2013.
Yi et al., "Stretchable and Waterproof Self-Charging Power System for Harvesting Energy from Diverse Deformation and Powering Wearable Electronics," *ACS Nano* 10(7):6519-6525, 2016 (7 pages).
Zheng et al., "Silicon-based hybrid cell for harvesting solar energy and raindrop electrostatic energy," *Nano Energy* 9:291-300, 2014.
Zhu et al., "3D spacer fabric based multifunctional triboelectric nanogenerator with great feasibility for mechanized large-scale production," *Nano Energy* 27:439-446, 2016.
Zhu et al., "Toward Large-Scale Energy Harvesting by a Nanoparticle-Enhanced Triboelectric Nanogenerator," *Nano Lett.* 73:847-853, 2013.

\* cited by examiner

WEARABLE TRIBOELECTRIC GENERATOR FOR ENERGY HARVESTING

CROSS-REFERENCE TO RELATED APPLICATION

This application claims the benefit of priority of Singapore Patent Application No. 10201702507W, filed Mar. 28, 2017, the contents of which being hereby incorporated by reference in its entirety for all purposes.

TECHNICAL FIELD

The disclosure relates generally to a triboelectric generator for energy harvesting, and in particular, to a water triboelectric generator and further, to a dual mode water and contact triboelectric generator. More particularly, the disclosure relates to a wearable water triboelectric generator and a wearable dual mode triboelectric generator for energy harvesting.

BACKGROUND

Triboelectric effect is one of the most universal phenomena in daily life, and it can explain most daily static electricity that is generated from mechanical contact. Triboelectric generator (TEG) is an energy technology that is based on the triboelectric effect and electrostatic induction to convert the mechanical energy to electricity. Concretely, the periodic physical contact and separation between two materials with different triboelectric polarity establishes an electric potential difference, which drives electrons to flow through an external load and generate continuous outputs. So far, most of the existing TEGs are designed to operate between two solid materials under dry conditions to keep its high output. However, it has also been confirmed that triboelectricity can be created from rainwater droplets falling from the sky or water flowing through an insulating tube, such as silicone tube, which causes the water to be positively or negatively charged. In addition, flowing water not only carries mechanical energy, but also produces triboelectricity due to the contact electrification process with air or other materials. Therefore, tremendous efforts are focusing on developing water TEGs to collect the triboelectric energy generated from water in motion.

At present, most water TEGs are designed based on synthetic polymeric films, such as polytetrafluoroethylene (PTFE), polyvinylidene difluoride (PVDF), poly(vinylidene fluoride-co-hexafluoropropene) (P(VDF-HFP)), fluorinated ethylene propylene (FEP), poly(methyl methacrylate) (PMMA), polydimethylsiloxane (PDMS), kapton (polyimide), acrylic, etc. Indeed, synthetic polymeric films possess low dielectric constant, high thermal stability, good mechanical strength and plasticity, which are so important to meet the applications requirements of high performance electronics. However, such synthetic polymeric films are not particularly suitable for wearability purposes.

Therefore, there remains a need to provide for wearable water triboelectric generators for energy harvesting.

SUMMARY

According to a first aspect of the disclosure, there is disclosed a wearable water triboelectric generator comprising:

a substrate having a first surface and a second surface, wherein the first surface and the second surface are opposing to each other; and an electrode positioned on the second surface, wherein the first surface comprises a modified hydrophobic surface comprising a coating of hydrophobic cellulose oleoyl ester nanoparticles.

According to a second aspect of the disclosure, there is disclosed a method for forming a wearable water triboelectric generator of the first aspect, the method comprising:

providing a substrate, wherein the substrate comprises a first surface and a second surface, wherein the first surface and the second surface are opposing to each other;

coating a suspension comprising hydrophobic cellulose oleoyl ester nanoparticles onto the first surface of the substrate to obtain a treated substrate;

drying the treated substrate; and coating an electrode on the second surface of the treated substrate.

According to a third aspect of the disclosure, there is disclosed a wearable dual mode water and contact triboelectric generator comprising:

a water triboelectric generator, wherein the water triboelectric generator comprises a first substrate having a first surface and a second surface, wherein the first surface and the second surface are opposing to each other; and wherein the first surface comprises a modified hydrophobic surface comprising a coating of hydrophobic cellulose oleoyl ester nanoparticles; and a contact triboelectric generator, wherein the contact triboelectric generator comprises a second substrate having a third surface and a fourth surface, wherein the third surface and the fourth surface are opposing to each other, the contact triboelectric generator further comprises a third substrate having a fifth surface and a sixth surface, wherein the fifth surface and the sixth surface are opposing to each other, the contact triboelectric generator further comprises a spacer positioned between the second substrate and the third substrate such that the spacer is close to or in contact with the fourth surface of the second substrate and the fifth surface of the third substrate, the contact triboelectric generator further comprises a first electrode coated on the third surface of the second substrate, and further comprises a second electrode coated on the sixth surface of the third substrate, such that the first electrode and the second electrode are opposing, wherein the water triboelectric generator and the contact triboelectric generator are arranged such that the first substrate of the water triboelectric generator completely surrounds or encapsulates the contact triboelectric generator, and wherein the second surface of the first substrate contacts the first electrode and the second electrode of the contact triboelectric generator.

According to a fourth aspect of the disclosure, there is disclosed a method for forming a wearable dual mode water and contact triboelectric generator of the third aspect, the method comprising:

providing a first substrate, wherein the first substrate comprises a first surface and a second surface, wherein the first surface and the second surface are opposing to each other;

coating a suspension comprising hydrophobic cellulose oleoyl ester nanoparticles onto the first surface of the first substrate to obtain a treated first substrate;

drying the treated first substrate;

providing a second substrate having a third surface and a fourth surface, wherein the third surface and the fourth surface are opposing to each other, wherein a first electrode is coated on the third surface of the second substrate;

providing a third substrate having a fifth surface and a sixth surface, wherein the fifth surface and the sixth surface are opposing to each other, wherein a second electrode is coated on the sixth surface of the third substrate, such that the first electrode and the second electrode are opposing;

positioning a spacer between the second substrate and the third substrate such that the spacer is close to or in contact with the fourth surface of the second substrate and the fifth surface of the third substrate; and arranging the treated first substrate such that the treated first substrate completely surrounds or encapsulates the second substrate and the third substrate, wherein the second surface of the treated first substrate contacts the first electrode and the second electrode of the second substrate and the third substrate, respectively.

BRIEF DESCRIPTION OF THE DRAWINGS

In the drawings, like reference characters generally refer to the same parts throughout the different views. The drawings are not necessarily drawn to scale, emphasis instead generally being placed upon illustrating the principles of various embodiments. In the following description, various embodiments of the invention are described with reference to the following drawings.

DESCRIPTION

Figure 1:
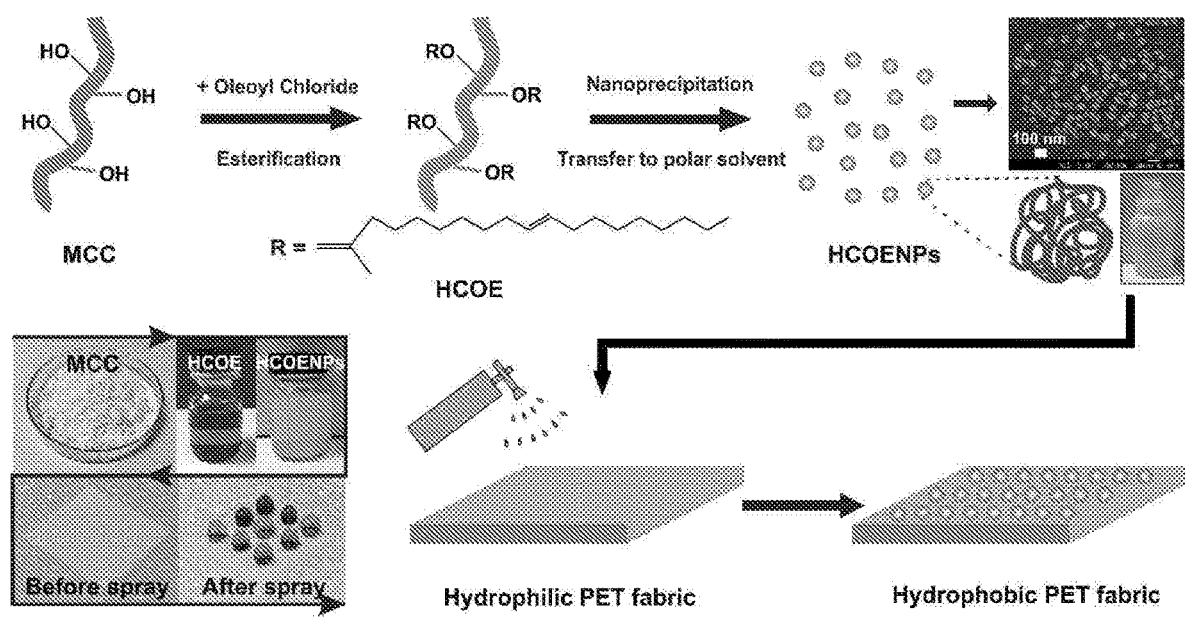
FIG. 1 shows a schematic illustration of the preparation process of hydrophobic cellulose oleoyl ester nanoparticles (HCOENPs) and hydrophobic polyethylene terephthalate (PET) fabric.

The following detailed description refers to the accompanying drawings that show, by way of illustration, specific details and embodiments in which the invention may be practised. These embodiments are described in sufficient detail to enable those skilled in the art to practise the invention. Other embodiments may be utilized and structural, chemical, material and electrical changes may be made without departing from the scope of the invention. The various embodiments are not necessarily mutually exclusive, as some embodiments can be combined with one or more other embodiments to form new embodiments.

Fabric-based or flexible substrate-based water TEGs are particularly suitable for wearable devices owing to their excellent flexibility, good breathability and high compatibility to the human or animal body. However, realization of a waterproof or water resistant substrate, such as fabric based on commonly used fabrics (whether natural or synthetic), and further development of the waterproof or water resistant substrate to an efficient water TEG to harvest water energy is the primary challenge, predominantly due to the poor water resistance of the substrates such as fabrics, which is related to their intrinsic hydrophilicity that can be ascribed to their abundant hydrophilic groups, and the strong adsorption capacity due to their large specific surface area.

To this end, present effort is directed to the use of cellulose to modify the surface properties of the underlying substrate or fabric. Cellulose is a naturally occurring hydrophilic polymer with a large number of hydroxyl (—OH) groups on its molecular surface. In order to fundamentally achieve cellulose with hydrophobicity and even super hydrophobicity, chemical modifications on the molecular scale are required. For example, a series of chemical modifications could be carried out on the cellulose molecule, such as esterification, etherification, and graft copolymerization.

In present disclosure, esterification (though not necessarily limited to this modification mode) was performed on the cellulose molecules by grafting oleoyl chloride to prepare HCOENPs for the functional fabrication of a water TEG for water energy harvesting. The preparation process of HCOENPs, waterproof substrates or fabrics, and the fabrication of fabric-based TEGs could be controlled via different conditions, which will be explained in later paragraphs.

It is to be understood and appreciated by a person skilled in the art that while the following paragraphs and examples relate particularly to substrates comprising fabrics for the sake of brevity and illustration, the scope of the present disclosure is not limited to such substrates. In other words, diverse types of substrates, preferably substrates which are flexible and capable of being surface modified, may be used for energy harvesting. In this respect, various types of substrates, such as a cellulose nanofiber (CNF) film, A4 paper, and glass slide, have been coated with HCOENPs and such surface modified substrates have demonstrated waterproof or water resistant properties (FIG. 4) after the coating.

FIG. 1 shows a schematic illustration of the preparation process of HCOENPs and hydrophobic PET fabric.

First, the hydrophobic cellulose oleoyl ester (HCOE) was synthesized by grafting with the oleoyl chloride via esterification modification based on the MCC. Other types of cellulosic materials or structures may also be used. For example, cellulose nanocrystalline (CNC) and cellulose nanofiber (CNF) may be used. In one illustration, cellulose is dried thoroughly and 1 g of the dried cellulose is suspended in about 10 to 60 mL pyridine and is heated up to about 100° C. The reaction is purged with nitrogen, and about 0.1 to 40 mL oleoyl chloride is added into the cellulose suspension, and the reaction is performed at about 100° C. for about 30 to 90 min.

Figure 2:
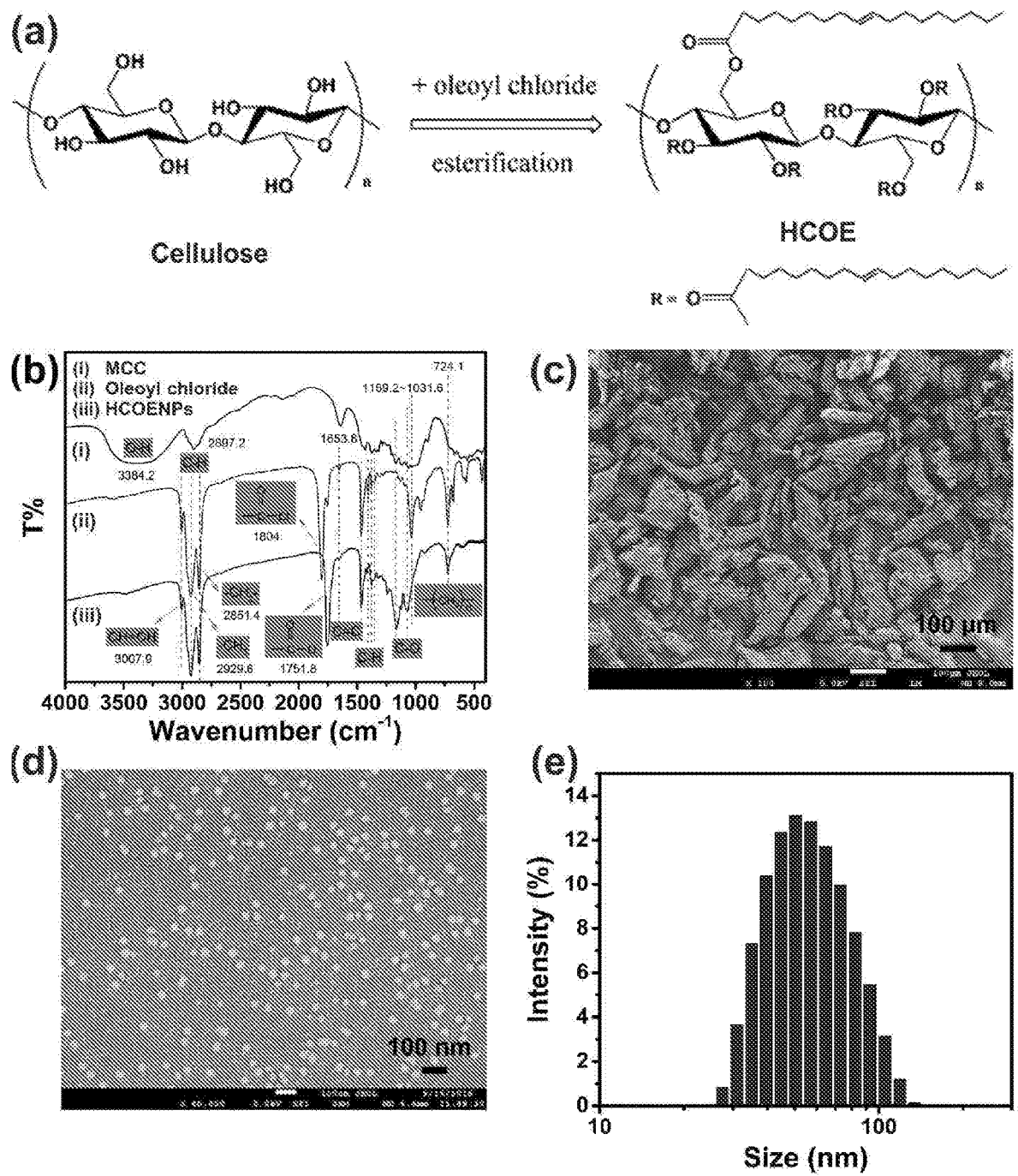
FIG. 2 shows: (a) a schematic synthesis process of hydrophobic cellulose oleoyl ester (HCOE); (b) Fourier transform infrared (FTIR) spectra of (i) microcrystalline cellulose (MCC), (ii) oleoyl chloride, and (iii) HCOENPs; (c) Scanning electron microscopy (SEM) image of MCC; (d) SEM image of HCOENPs; (e) size distribution of HCOENPs.

The resultant HCOE is further transferred from a weak (or non) polar solvent to a polar solvent to obtain the HCOENPs via nanoprecipitation. FIG. 2(a) shows the resultant modified cellulose with hydrophobic aliphatic chains which replace the original hydroxyl groups to achieve the hydrophobicity. FTIR result as shown in FIG. 2(b) was used to confirm the modification process. The strong peak at 3384.2 cm$^{-1}$ that belongs to the stretching vibration of —OH groups disappeared in the resultant samples of HCOENPs (curve iii). The resultant modified cellulose (curve iii) shows many new peaks that appear at 3007.9, 2929.6, 2851.4, 1751.8, 1653.8, 1169.2≈1031.6, and 724.1 cm$^{-1}$, which are attributed to the group of CH=CH, —CH$_3$, —CH$_2$—, C=O, C=C, C—O, and —(CH$_2$)—, respectively. It is clear that the appearance of these new groups comes from the oleoyl chains (compared with curve ii). It indicates that the oleoyl chloride is successfully grafted onto the cellulose, giving the product named as HCOE.

After transferring to a polar solvent, the HCOE product is separated by removing the polar solvent and thereafter, the HCOE product is further purified via repeated dissolution in weak or non-polar solvent and precipitation in polar solvent. In one illustration, the purification step is performed for 2 to 5 times before storing the resultant HCOE in a weak or non-polar solution termed as a mother solution.

As mentioned above, the HCOENPs are prepared by nanoprecipitation via transferring the HCOE from a weak (or non-) polar solvent to a polar solvent. In this case, a HCOENPs suspension is prepared via dropwise addition of the mother solution of HCOE to a polar solvent under stirring of about 200 to 1,200 rpm at room temperature. The average size of the HCOENPs may range from about 30 to 500 nm, depending on the weight concentration of the HCOE mother solution at the above stated stirring conditions. For example, about 0.001 to 20 wt %, preferably about 0.01 to 20 wt %, of the HCOE mother solution at the above stated stirring conditions give rise to HCOENPs having an average size of about 30 to 500 nm.

The weak or non-polar solvent is selected such that the HCOE dissolves therein partially or completely, preferably completely. Accordingly, the weak or non-polar solvent may include, but is not limited to, hexane, cyclohexane, cyclopentane, n-heptane, i-propyl ether, ethyl ether, isobutyl alcohol, dichloromethane (DCM), ethylene dichloride, n-butanol, n-butyl acetate, n-propanol, methyl isobutyl ketone, and tetrahydrofuran (THF).

The polar solvent is selected such that the nanoprecipitation of HCOE is achieved. Accordingly, the polar solvent may include, but is not limited to, ethanol, isopropanol (IPA), ethyl acetate, chloroform, acetone, aniline, dimethyl formamide (DMF), methanol, dimethyl sulfoxide (DMSO), and water.

The above described chemical modification is subsequently applied to a substrate or fabric in order to render its surface hydrophobic, thereby obtaining a substrate or fabric having a modified hydrophobic surface.

Thus, in accordance with one aspect of the present disclosure, a wearable water TEG is provided, as illustrated in FIG. 5(a). The wearable water TEG includes a substrate, for example, a fabric. In present context, a fabric is formed of a wearable material(s), therefore rendering the resultant TEG wearable. In present context, the terms "fabric" and "textile" may be used interchangeably. The term "wearable" or its associated term, in connection with a material or component, is given its ordinary meaning, i.e. that material or component possesses good flexibility or deformability, good breathability and high compatibility to the human or animal body.

In various embodiments, the fabric is a natural textile, synthetic textile, or a combination or blend of either or both. The fabric may include, but is not limited to, cotton fabric, silk fabric, flax fabric, PET fabric, polyurethane (PU) fabric, nylon, and PET/PU fabric, or PET/nylon fabric. Additionally, in the present context, the term "fabric" includes micro/nano-fiber membranes, which belong to the non-woven fabrics. The micro/nano-fiber membrane may be fabricated from one or more polymers as a random structure or a regular weaved structure by using different fabrication methods such as electrospinning, melt-blow, wet spinning, 3D printing, etc. The one or more polymers forming the micro/nano-fiber membrane may include polyvinyl alcohol (PVA), polyvinylpyrrolidone (PVP), polyacrylonitrile (PAN), polyimide (PI), polyvinylidene fluoride (PVDF), poly(vinylidenefluoride-hexafluoropropylene) (PVDF-HFP), poly[(vinylidenefluoride-co-trifluoroethylene] (PVDF-TrFE), poly(vinylidene fluoride-co-chlorotrifluoroethylene) (PVDF-CTFE), and poly(vinylidene fluoride-co-chlorotrifluoroethylene-co-chlorofluoroethylene) (PVDF-TrFE-CFE). With coating of the HCOENPs, these micro/nano-fiber membranes may be used for water energy harvesting.

The substrate or fabric includes a first surface and a second surface. The substrate or fabric may include a modified hydrophobic surface at the first surface, wherein the first surface is modified as described in earlier paragraphs to form a coating of HCOENPs thereon. By "a modified hydrophobic surface" is meant that the surface may initially be hydrophilic and is rendered hydrophobic due to the coating of HCOENPs, or alternatively, the surface may initially be hydrophobic and is rendered more hydrophobic (i.e. larger contact angles) due to the coating of HCOENPs. The second surface may or may not be modified to form a coating of HCOENPs thereon. In other words, it is essential that the first surface is rendered hydrophobic while it is optional for the second surface.

In various embodiments, the substrate or fabric may first be pretreated with an alkaline aqueous solution having a concentration of about 0.01 to 2 mol/L. The alkaline aqueous solution may be sodium hydroxide (NaOH), potassium hydroxide (KOH), or calcium hydroxide (Ca(OH)$_2$). The pre-treatment step with an aqueous alkaline solution may or may not be required, depending, for example, on the type of substrate to be modified. In the instance where a fabric is used as the substrate, the pre-treatment step is preferably carried out whereby the pre-treatment advantageously helps in removing dirt particles such as ash or wax on the fabric, thereby improving the subsequent coating effect. On the other hand, for other types of substrates, such as a cellulose nanofiber film, paper, or glass, the pre-treatment step may not be required.

In various embodiments, the substrate or fabric may be pretreated with the alkaline aqueous solution at about 20 to 100° C. For example, the substrate or fabric may be pretreated with the alkaline aqueous solution having a concentration of about 0.01 to 2 mol/L at about 20 to 100° C.

In various embodiments, the substrate or fabric may be pretreated with the alkaline aqueous solution for about 10 to 120 min. For example, the substrate or fabric may be pretreated with the alkaline aqueous solution having a concentration of about 0.01 to 2 mol/L for about 10 to 120 min. In another example, the substrate or fabric may be pretreated with the alkaline aqueous solution at about 20 to 100° C. for about 10 to 120 min. In a further example, the substrate or fabric may be pretreated with the alkaline aqueous solution having a concentration of about 0.01 to 2 mol/L at about 20 to 100° C. for about 10 to 120 min.

In preferred embodiments, the substrate or fabric may be pretreated with 0.5 mol/L NaOH aqueous solution at 60° C. for 60 min, or 1.0 mol L$^{-1}$ NaOH aqueous solution at 50° C. for 120 min, or 1 mol/L aqueous KOH solution at 40° C. for 80 min, or 1.2 mol/L aqueous KOH solution at 50° C. for 50 min.

After the pretreatment step, the substrate or fabric may be coated with a HCOENPs suspension.

In various embodiments, a HCOENPs suspension of about 0.001 to 20 wt % may be coated on the first surface of the substrate or fabric and thereafter, the coated substrate or fabric may be dried in air, for example, under about 60° C. to obtain a waterproof substrate or fabric. The HCOENPs suspension may be coated using various known techniques such as dip coating, spin coating, spray coating, and solution casting.

The substrate or fabric includes an electrode on the second surface, wherein the second surface may be opposing to the first surface. The electrode may be formed of any electrically conducting material or metal including, but is not limited to, gold (Au), copper (Cu), silver (Ag), platinum (Pt), or aluminium (Al).

The above described wearable water TEG relates to a single electrode arrangement and may be extended to a dual mode wearable water and contact TEG.

Thus, in accordance with another aspect of the present disclosure, a dual mode wearable water and contact TEG is provided, as illustrated in FIG. 5(b). The dual mode wearable water and contact TEG includes a water TEG and a contact TEG.

The water TEG includes a first substrate or fabric having a first surface and a second surface. The first surface and the second surface are opposing to each other. The first substrate or fabric may include a modified hydrophobic surface at the first surface, wherein the first surface is modified as described in earlier paragraphs to form a coating of HCOENPs thereon. Alternatively, the first substrate or fabric may include a modified hydrophobic surface at the second surface, wherein the second surface is modified as described in earlier paragraphs to form a coating of HCOENPs thereon. Yet still, the first substrate or fabric may include a respective modified hydrophobic surface at the first surface and the second surface, wherein the first surface and the second surface are modified as described in earlier paragraphs to form a respective coating of HCOENPs thereon.

The contact TEG includes a second substrate or fabric having a third surface and a fourth surface, wherein the third surface and the fourth surface are opposing to each other. The contact TEG further includes a third substrate or fabric having a fifth surface and a sixth surface, wherein the fifth surface and the sixth surface are opposing to each other. Both of the second substrate or fabric and the third substrate or fabric may or may not include a surface modified by the HCOENPs. The second substrate or fabric and the third substrate or fabric of the contact TEG are chosen such that they are not comprised of the same material.

The contact TEG further includes a spacer positioned between the second substrate or fabric and the third substrate or fabric such that the spacer is close to or in contact with the fourth surface of the second substrate or fabric and the fifth surface of the third substrate or fabric.

The contact TEG further includes a first electrode coated on the third surface of the second substrate or fabric, and additionally includes a second electrode coated on the sixth surface of the third substrate or fabric, such that the first electrode and the second electrode of the contact TEG are opposing.

The water TEG and the contact TEG are arranged such that the first substrate or fabric of the water TEG completely surrounds or encapsulates the contact TEG, wherein the second surface of the first substrate or fabric contacts the first electrode and the second electrode of the contact TEG. In other words, the water TEG and the contact TEG share a common first electrode and a common second electrode as shown in FIG. 5(b).

The above discussion with respect to the substrate or fabric of the water TEG applies also to the second substrate or fabric and third substrate or fabric of the contact TEG, and is not repeated hereinafter for the sake of brevity. However, the key difference between the substrate or fabric of the water TEG and the second and third substrates or fabrics of the contact TEG is that the second and third substrates or fabrics of the contact TEG may or may not be modified with a coating of HCOENPs. In other words, the substrate or fabric of the water TEG (i.e. the outer surface of the dual mode water and contact TEG) must be coated with HCOENPs, thereby rendering this surface waterproof or water resistant. The surface(s) of the second and third substrates or fabrics of the contact TEG, as mentioned above, may or may not be rendered waterproof or water resistant. In embodiments where the second substrate or fabric does not include a surface to be modified by the HCOENPs, a pre-treatment step with an aqueous alkaline solution may or may not be required, as discussed in earlier paragraphs. Likewise, in embodiments where the third substrate or fabric does not include a surface to be modified by the HCOENPs, a pre-treatment step with an aqueous alkaline solution may or may not be required.

Likewise, the above discussion on the electrode of the water TEG applies to the first electrode and the second electrode of the contact TEG, and is not repeated hereinafter for the sake of brevity.

In various embodiments, the spacer enables the positive substrate or fabric material and negative substrate or fabric material to contact and separate quickly with a fixed gap (about 0.1 to 2 mm). In present context, the triboelectric series provide the relative triboelectric polarity of some materials, particularly fabrics. The PET fabric is classified as "negative" while cotton as "positive" because the relative triboelectric polarity of cotton is more positive than that of the PET fabric. There is no restriction for the relative polarities of various fabrics. For contact TEG, the output performance depends on the relative triboelectric polarity difference of the two materials (positive and negative). Higher relative triboelectric polarity difference will induce more charge to have a higher output. As an example, for maximum output, the substrate or fabric (i.e. Fabric 1 in FIG. 5(b)) that is nearer to the where the water is falling on preferably has a lower affinity for negative charges than the substrate or fabric that is further (i.e. Fabric 2 in FIG. 5(b)) from where the water is falling on. The spacer may be an insulating elastic material or a polymer elastomer such as PDMS, Ecoflex, PU, polyamide (PA), PET, poly(styrene-butadiene-styrene) (SBS), and polyolefin elastomer (POE). The shape of spacer may be a film, spring, pillar, sphere, etc.

The presently disclosed water TEG and dual mode water and contact TEG are particularly suitable for water energy harvesting.

In order that the invention may be readily understood and put into practical effect, particular embodiments will now be described by way of the following non-limiting examples.

EXAMPLES

Example 1

In this example, HCOENPs were prepared by a non-toxic chemical modification method and nanoprecipitation technology based on the microcrystalline cellulose (MCC). The HCOENPs were then used to coat on daily fabrics (e.g. PET fabric, cotton fabric, silk fabric, flax fabric, nylon fabric, PU fabric, and PET/Nylon fabric, etc.) to construct a hydrophobic surface with rough structure and low surface energy, making the resultant fabrics capable of delivering superhydrophobicity and maintain good air permeability (FIG. 1). Furthermore, this non-toxic waterproof fabric was designed as water TEG for harvesting water energy. The output voltage and current is 15 V, 4 µA, respectively, giving 0.26 W/m$^2$ for single mode TEG (FIG. 5(a)). In addition, the all-fabric-based dual mode TEG combined by water TEG and contact TEG were further fabricated to enhance the output efficiency of electricity from both triboelectric energy and mechanical energy of water. An instantaneous power density of 0.56 W/m², 25 V, 5 µA, with dual mode TEG can be achieved (FIG. 5(b)).

Example 1A 1 g CNF was dried thoroughly, suspended in 30 mL pyridine and heated up to 100° C., while the system was purged with nitrogen, followed by addition of 7.5 mL oleoyl chloride. The reaction was performed at 100° C. for 60 min. Thereafter, 180 mL methanol was poured into the mixture to precipitate the product, which was then removed by filtration. The precipitated product was further purified 2 times via repeated dissolution in dichloromethane (DCM) and precipitation in methanol. The resultant DCM solution of hydrophobic cellulose oleoyl ester (1 mL, 2 wt %) was added dropwise to deionized water (40 mL) under stirring of 600 rpm at room temperature to obtain an aqueous suspension of HCOENPs (0.05 wt %) with an average size of about 30 nm.

Cotton fabric and PET fabric (5 cm×5 cm) were pretreated with a 0.5 mol/L aqueous sodium hydroxide solution (NaOH) at 60° C. for 60 min. Next, 2.5 wt % aqueous suspension of HCOENPs was coated on the pretreated cotton fabric and PET fabric by dip-coating method, followed by drying under 60° C. to obtain waterproof cotton and PET fabric. The measured contact angles of the waterproof cotton and PET fabric reached 153.8° and 162.1°, respectively, as shown in FIG. 7(a).

A gold (Au) electrode (1 cm×1 cm) was sprayed-coated onto the waterproof cotton fabric to obtain a water-TEG, as shown in FIG. 5(a). The measured open-circuit output voltage and current for harvesting water energy were about 15 V and 4 µA, respectively, (FIG. 7(b-c)). The measured instantaneous power density is about 0.26 W/m².

Furthermore, as shown in FIG. 5(b), a copper (Cu) foil (1 cm×1 cm) (Electrode 1) was inserted between a PET fabric (Fabric 1) and a waterproof PET fabric. Separately, a pretreated-cotton fabric (Fabric 2) was covered by a Cu foil electrode (1 cm×1 cm) (Electrode 2). A spacer material is positioned between Fabric 1 and Fabric 2 to separate them apart. Thereafter, a dual-mode TEG formed of the above configuration was encapsulated as shown in FIG. 5(b).

Example 1B 0.5 g cellulose nanocrystalline (CNC) was dried thoroughly, suspended in 20 mL pyridine and heated up to 100° C., while the system was purged with nitrogen, followed by addition of 5 mL oleoyl chloride. The reaction was performed at 100° C. for 80 min. Thereafter, 125 mL ethanol was poured into the mixture to precipitate the product, which was then removed by filtration. The precipitated product was further purified 2 times via repeated dissolution in the tetrahydrofuran (THF) and precipitation in ethanol. The resultant THF solution of hydrophobic cellulose oleoyl ester (0.5 mL, 5 wt %) was added dropwise to a mixed solvent of acetone/dimethyl formamide (DMF) (5 mL) under stirring of 1,000 rpm at room temperature to obtain an acetone/DMF suspension of HCOENPs (0.5 wt %) with an average size of about 80 nm.

Silk fabric and PET fabric (5 cm×5 cm) were pretreated with a 1 mol/L aqueous potassium hydroxide solution (KOH) at 40° C. for 80 min. Next, 4 wt % acetone/DMF suspension of HCOENPs was coated on the pretreated silk fabric and PET fabric by spin-coating method, followed by drying under 60° C. to obtain waterproof silk fabric and PET fabric. The measured contact angles of the waterproof silk fabric and PET fabric were 147.3° and 162.1°, respectively, as shown in FIG. 7(a).

An Au electrode (1 cm×1 cm) was sprayed-coated onto the waterproof silk fabric to obtain a water-TEG, as shown in FIG. 5(a). The measured open-circuit output voltage and current for harvesting water energy were about 15 V and 2 µA (FIG. 7(b-c)), respectively.

Furthermore, as presented in FIG. 5(b), a Cu foil (1 cm×1 cm) could also be used as an electrode (Electrode 1) to insert between a silk fabric (Fabric 1) and a waterproof PET fabric. Separately, a pretreated-PET fabric (Fabric 2) was covered by a Cu foil electrode (1 cm×1 cm) (Electrode 2). A spacer material is positioned between Fabric 1 and Fabric 2 to separate them apart. Thereafter, a dual-mode TEG formed of the above configuration was encapsulated as shown in FIG. 5(b). The measured open-circuit output voltage and output current for harvesting water energy were close to the respective output of the dual-mode TEG of Example 1. Also, the output current density value is equal to the output current value because the electrode area is 1 cm². The measured instantaneous power density of the dual-mode TEG is 0.56 W/m² at the output of 25 V and 5 µA.

Example 1C 2 g microcrystalline cellulose (MCC) was dried thoroughly, suspended in 80 mL pyridine and heated up to 100° C., while the system was purged with nitrogen, followed by addition of 17 mL oleoyl chloride. The reaction was performed at 100° C. for 90 min. Thereafter, 320 mL ethanol was poured into the mixture to precipitate the product, which was then removed by filtration. The precipitated product was further purified 3 times via repeated dissolution in the hexane and precipitation in ethanol. The resultant hexane solution of hydrophobic cellulose oleoyl ester (2 mL, 5 wt %) was added dropwise into the ethanol (50 mL) under stirring of 1,200 rpm at room temperature to obtain an ethanol suspension of HCOENPs (0.2 wt %) with an average size of about 120 nm.

Flax fabric, PET fabric and PET/Nylon fabric (5 cm×5 cm) were pretreated with a 1.2 mol/L aqueous KOH solution at 50° C. for 50 min. Next, 5 wt % acetone/DMF suspension of HCOENPs was coated on the pretreated flax fabric and PET/Nylon fabric by spray-coating method, followed by drying under 60° C. to obtain waterproof flax fabric and PET/Nylon fabric. The measured contact angles of the waterproof flax fabric and PET/Nylon fabric were 151.7° and 150.4°, respectively, as shown in FIG. 7(a).

An Au electrode (1 cm×1 cm) was sprayed-coated onto the waterproof flax fabric to obtain a water-TEG based on the flax fabric, as shown in FIG. 5(a). The measured open-circuit output voltage and current for harvesting water energy were about 15 V and 3 µA (FIG. 7(b-c)), respectively.

Furthermore, as presented in FIG. 5(b), a Cu tape (1 cm×1 cm) could also serve as an electrode (Electrode 1) to insert between a flax fabric (Fabric 1) and a waterproof PET/Nylon fabric. Separately, a pretreated-PET fabric (Fabric 2) was covered by a Cu tape electrode (1 cm×1 cm) (Electrode 2). A spacer material is positioned between Fabric 1 and Fabric 2 to separate them apart. Thereafter, a dual-mode TEG formed of the above configuration was encapsulated as shown in FIG. 5(b).

Example 1. Results and Discussion

Superhydrophobic and Anti-Fouling Coating

Figure 3:
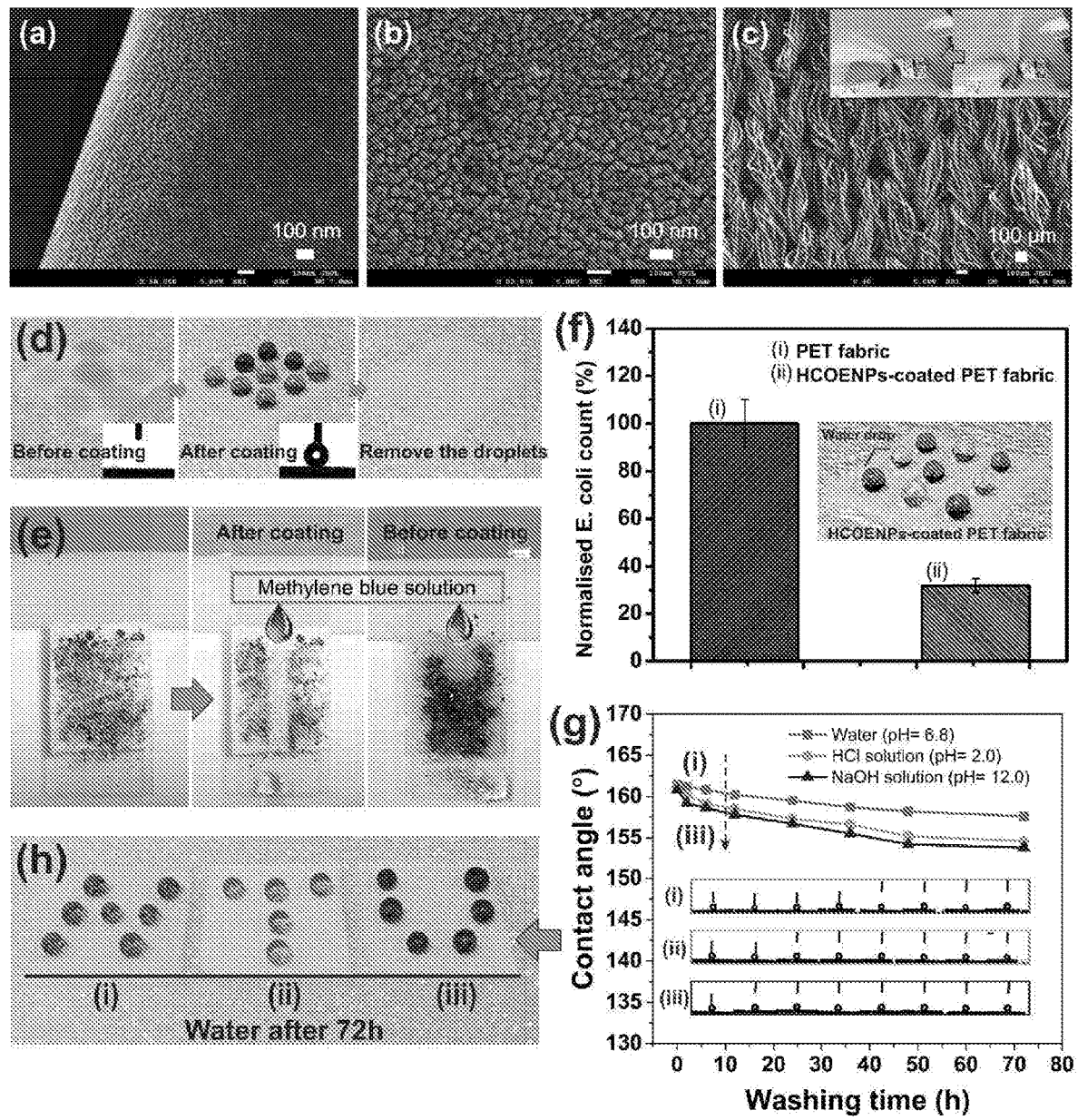
FIG. 3 shows a demonstration of the performance of HCOENPs-coated superfine PET fabric according to Example 1: (a-b) morphology of HCOENPs coated on a single fiber; (c) the yards structure of the HCOENPs-coated superfine PET fabric; (d) photograph of the hydrophobicity of PET fabric before and after being coated with HCOENPs. Inserts are the contact angle, respectively; (e) self-cleaning presentation for dust of a PET fabric before and after being coated with HCOENPs; (f) anti-fouling performance for *Escherichia coli* (*E. coli*) of a PET fabric before and after being coated with HCOENPs; (g) dependence of contact angle of HCOENPs-coated PET fabric on different washing time in (i) neutral, (ii) acidic, and (iii) alkaline harsh environment; (h) photographs of the waterproof performance of HCOENPs-coated PET fabric after undergoing the (i) neutral, (ii) acidic, and (iii) alkaline harsh environment.

SEM images revealed that the resultant HCOENPs are uniform spheres with sizes of about 35±5 nm (FIG. 2(d)), which is a significantly reduced size compared to MCC (FIG. 2(c)). In addition, it is consistent with the result of size distribution (FIG. 2(e)). Additionally, using different stirring speed to precipitate the HCOE solution with increasing concentration, a series of HCOENPs with gradually increased size from about 30 nm to 500 nm (FIG. 6(c)) was obtained. HCOENPs size increases with an increase in the HCOE concentration and a reduction in the stirring speed. HCOENPs were coated on the superhydrophilic PET fabric to achieve a waterproof textile. FIG. 3(d) presents the HCOENPs-coated PET fabric which possesses a superhydrophobicity with a high contact angle of about 162.1°. SEM image confirms the HCOENPs (about 35±5 nm) were continuously covered on the rough surface of the PET fiber (FIG. 3(a-b)) to generate a very thin hydrophobic-coating. The resultant hierarchical structural composed of nanoscale particles and microscale fibers would not block the opening and decrease the breathability of the textile (FIG. 3(c)). FIG. 3(e-f) show HCOENPs-coated fabric possess a favorable anti-fouling performance for dust, dyes and E. coli, achieving daily textiles with self-cleaning and anti-bacterial properties. Moreover, FIG. 3(g-h) confirm the high stability of HCOENPs coating in a harsh environment. Furthermore, HCOENPs could also be used as a waterproof treatment for many other substrates, such as cellulose nanofiber film, A4 paper, glass slide (FIG. 4), which is a highly effective coating to achieve the waterproof performance after several times of coating.

Water Energy Harvesting TEG

Figure 8:
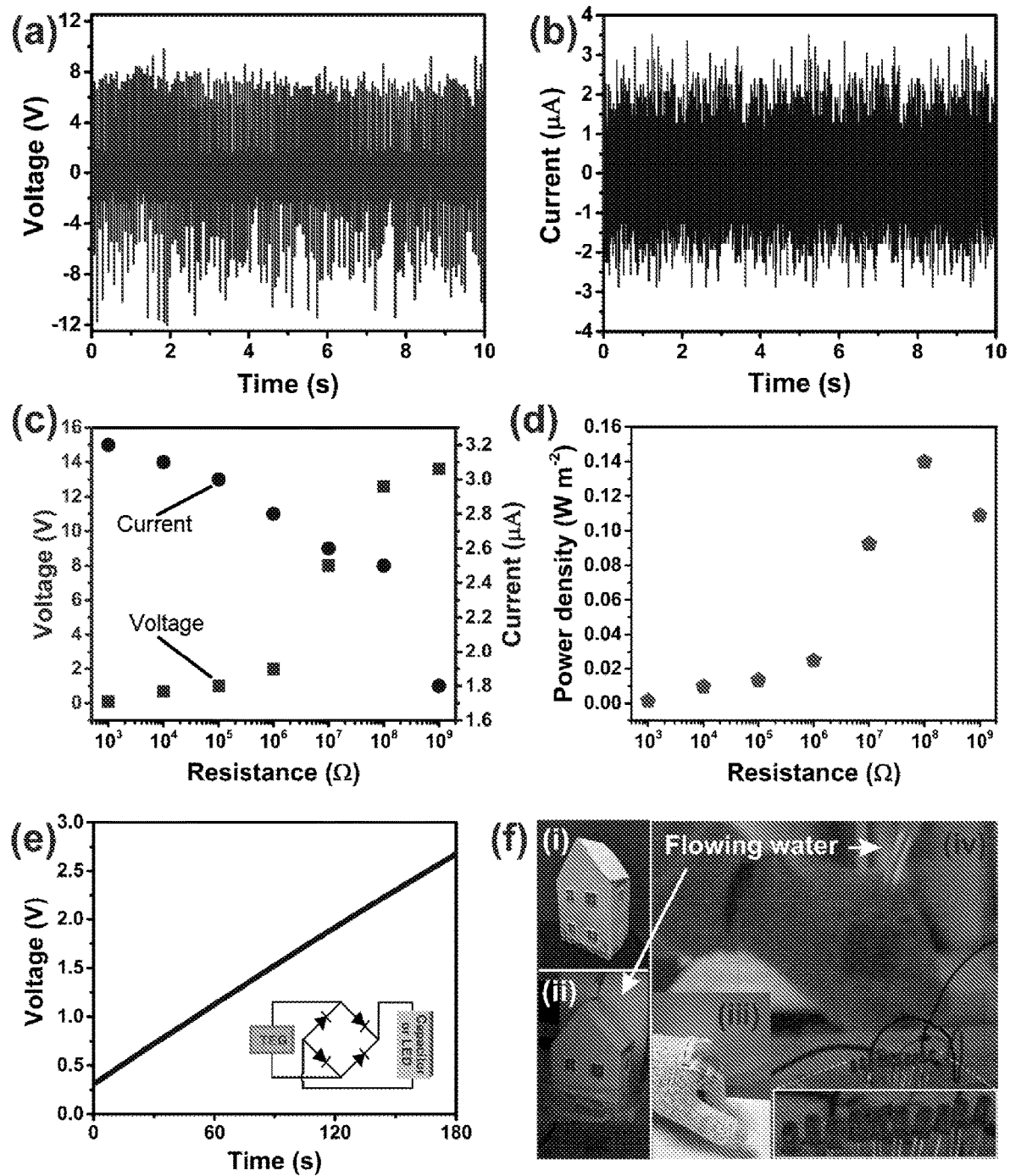
FIG. 8 shows: (a) output voltage and (b) output current of the PET fabric based water TEG according to Example 1. The flowing rate of water was 6 mL s$^{-1}$, and the distance between the water-TEG and the outlet of pipe was 10 cm; (c-d) dependence of (c) output voltage, (c) output current, (d) instantaneous power density of PET fabric based water-TEG on the resistance of external load; (e) charging curve of 10 μF capacitor by the PET fabric based water-TEG; (f) photographs of PET fabric water-TEG mounted on a roof to harvest water energy to drive commercial light emitting devices (LEDs) (i-ii). Based on the photographs of PET fabric based water-TEG incorporated into a cotton glove (iii) and which is deformable and flexible to fully match with the glove, it can be seen that the PET fabric based water-TEG works for harvesting water energy to drive commercial LEDs (iv).

PET is a good triboelectric materials owing to its negative triboelectric polarity. Thus, a TEG based on the superhydrophobic PET fabric was fabricated for harvesting water energy (FIG. 5(a)). For the measurement process, water was flowed out from a silicone rubber tube and the sequential impact on the device to generate continuous outputs was measured. FIG. 8(a-b) show that the corresponding output open-circuit voltage and current reach 15 V and 4 μA, respectively. The instantaneous power density was small when the resistance was below 1 MO, and the maximum values of 0.14 mW m$^{-2}$ at a load of 100 MΩ was achieved. The alternating current (AC) output of PET fabric based water TEG was easily converted to the direct current (DC) via a full-wave rectifying bridge (see insert of FIG. 8(e)). Accordingly, the present PET fabric based water TEG charged the 10 μF capacitor to 2.7 V in 180 s (FIG. 8(e)). This could light up commercial LEDs when mounted onto the roof or be woven into a cotton glove as exhibited in FIG. 8(f), showing a favorable flexibility and deformability to fully match the roof and textile morphology. It is a promising energy harvesting device for the wearable self-powered systems.

Furthermore, the output performance of many other TEGs based on different hydrophobic textiles (HCOENP-coated cotton, silk, flax, Nylon, PU, PET/Nylon) were measured (FIG. 7(a)). The output voltage of above mentioned devices had no obvious changes as shown in FIG. 7(b), suggesting that the HCOENPs coating would offer a fixed triboelectric polarity on various different substrates or fabrics. FIG. 7(c) reveals the devices possessed slightly different output current which was possibly due to the different substrates or fabrics having different transfer rate for the electrons. Moreover, devices decorated by HCOENPs with different sizes to probe the contribution of HCOENPs size for the output performance was studied. As shown in FIG. 6(d), the output voltage of the TEG increased when the fabric was decorated with the smaller HCOENPs, due to faster water detachment speed provided by the better hydrophobicity. And as expected, FIG. 6(e) indicates that even though the devices were fabricated from substrates or fabrics coated with different sizes of HCOENPs, a similar output current was obtained. This finding was reasonable as the output current is related to the substrate or fabric used as discussed in the explanation of FIG. 7(c) and the same substrate or fabric was used for the devices shown in FIG. 6(e).

Water Energy Harvesting TEG and Mechanical Energy Harvesting Contact TEG

As shown in FIG. 5(b), an all-fabric-wrapped dual-mode TEG that could harvest both the electrostatic energy and mechanical energy of water was designed by combining a water TEG and a contact TEG. In an example, PET fabric (negative material) and cotton fabric (positive material) were used for the configuration of contact TEG to collect the mechanical energy of water, and it was encapsulated by a waterproof PET fabric-based water TEG, which not only protected the contact TEG from wetting by water but also harvested the electrostatic energy of water.

Figure 9:
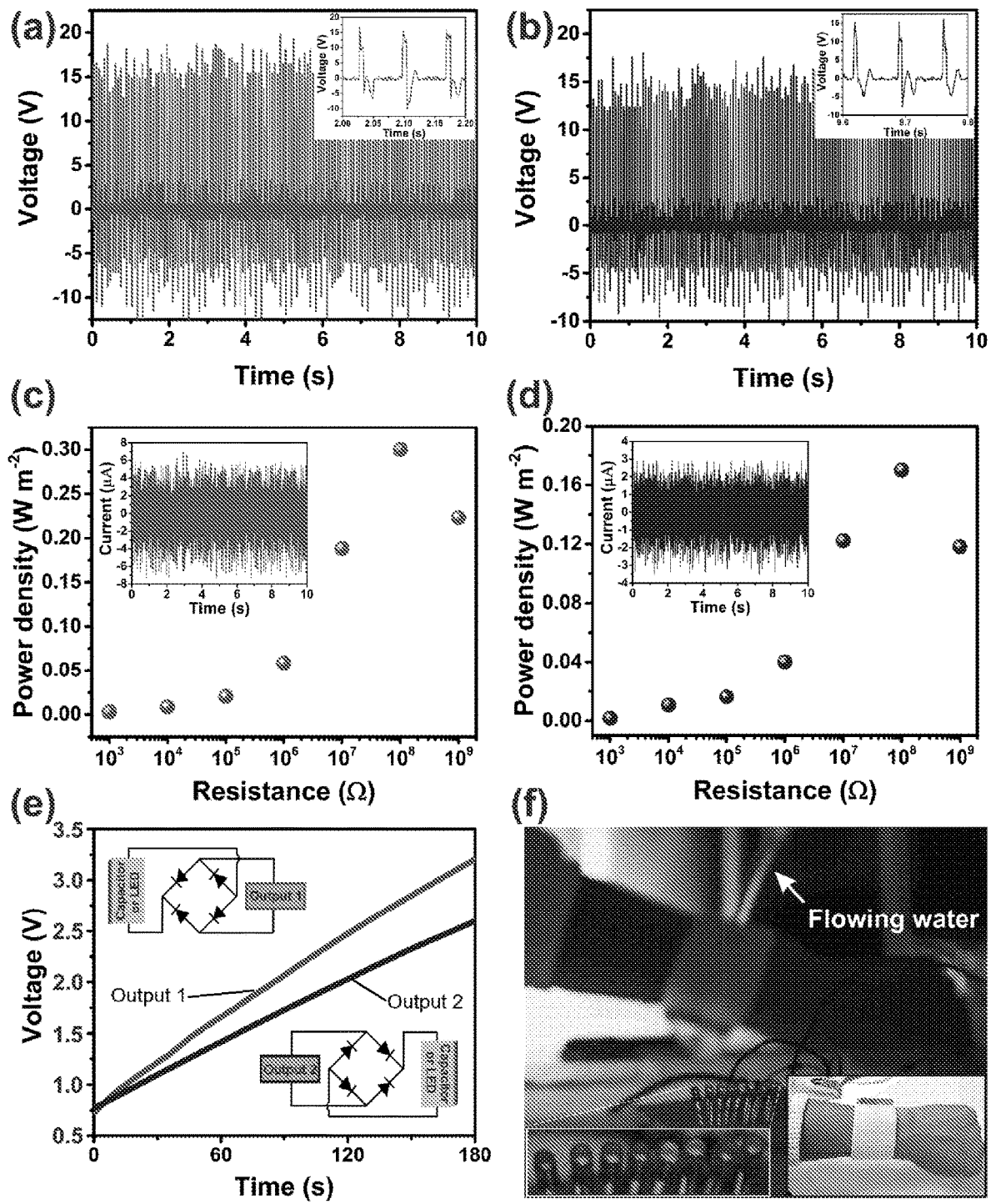
FIG. 9 shows: (a-b) output voltage from (a) Output 1 and (b) Output 2 of the all-fabric-based dual-mode TEG according to Example 1. Inserts are the magnified signals of output voltage; (c-d) instantaneous power density generated from (c) Output 1 and (d) Output 2 of the all-fabric-based dual-mode TEG. Inserts are the output current of (c) Output 1 and (d) Output 2, respectively. The flowing rate of water was 10 mL s$^{-1}$, and the distance between the water-TEG and the outlet of pipe was 20 cm; (se) charging curve of 10 μF capacitor by the all-fabric-based dual-mode TEG; (f) based on the photograph of an all-fabric-based dual-mode TEG fabricated into a wristband, it can been seen that the all-fabric-based dual-mode TEG is deformable and flexible to fully match with the hand contour, and the all-fabric-based dual-mode TEG can normally work for harvesting water energy to drive commercial LEDs. Insert is the photograph of a wristband shaped wearable all-fabric-based dual-mode TEG.

The working mechanism of dual mode TEG can be explained as a single electrode mode based on two separate water TEG and contact TEG. As shown in FIG. 9(a-b), the voltage values of Output 1 (FIG. 9(a)) and Output 2 (FIG. 9(b)) reached about 22 V and about 17.5 V, respectively, and current values of Output 1 and Output 2 achieved about 8 μA and about 4 μA, respectively (see inserts of FIG. 9(c), 9(d)). Accordingly, the instantaneous power density generated from Output 1 (FIG. 9(c)) and Output 2 (FIG. 9(d)) of the all-fabric-based dual mode TEG were about 0.30 W m$^2$ and about 0.17 W m$^2$ at a load resistance of about 100 MΩ. Using the rectifier output, a 10 μF capacitor could be charged to about 3.2 V and about 2.7 V by the Output 1 and Output 2 in about 180 s$^{-1}$, respectively (FIG. 9(e)). Moreover, the dual mode TEG could act as a wristband to harvest water energy for driving commercial LEDs (FIG. 9(f)). The excellent deformability of all-fabric construction enabled the TEG to completely conform to human wrist to perform the expected tasks. It therefore provided an attractive concept to design an enhanced energy harvesting device for wearable self-powered systems.

Example 2

In this example, a water energy harvesting on daily fabrics/textiles via treatment by HCOENPs has been realized, which involves a low-cost and non-toxic hydrophobic coating. It has been validated that the synthesized HCOENPs can achieve stable and effective waterproof performance for different fabrics, and provide the fabrics with self-cleaning and fouling resistant features. Consequently, daily fabrics such as cotton, silk, flax, PET, nylon, and PU have been confirmed as water TEG for water energy harvesting. As an example, PET fabric-based water TEG generates the output power density of 0.14 W m$^{-2}$ at a load resistance of 100 MO. It is easily incorporated into the cotton glove to drive the commercial LEDs. Moreover, an enclosed all-fabric-based dual mode TEG composed of cotton fabric, PET fabric, and waterproof PET fabric has been designed to collect both the electrostatic energy and mechanical energy of water, the maximum enhanced instantaneous output power density from Output 1 and Output 2 reaches 0.30 and 0.17 W m$^{-2}$, respectively. The fabric-based TEGs work well in harsh environment owing to their stable waterproof performance, self-cleaning, and fouling resistant advantages. Besides, the simple structure, favorable flexibility, deformability, and comfortability make it a promising energy harvesting device for the wearable self-powered systems.

Synthesis of Hydrophobic Cellulose Oleoyl Ester Nanoparticles:

Typically, 1 g microcrystalline cellulose (20 µm, Sigma-Aldrich) was dried thoroughly, suspended in 40 mL pyridine and was heated up to 100° C., while the system was purged with nitrogen, followed by adding 13.9 mL oleoyl chloride (29%, Sigma-Aldrich), and the reaction was performed at 100° C. for 90 min. Thereafter, ethanol was poured into the mixture to precipitate the product, which was then removed by filtration, and the product was further purified 3 times via repeated dissolution in dichloromethane (DCM) and precipitation in methanol. 1 mL of the resultant DCM solution of HCOE (40 mg mL$^{-1}$) was added dropwise into 20 mL ethanol under stirring of 1,200 rpm at room temperature to obtain an ethanol suspension of HCOENPs (2 mg mL$^{-1}$) with an average size about 35±5 nm.

Figure 4:
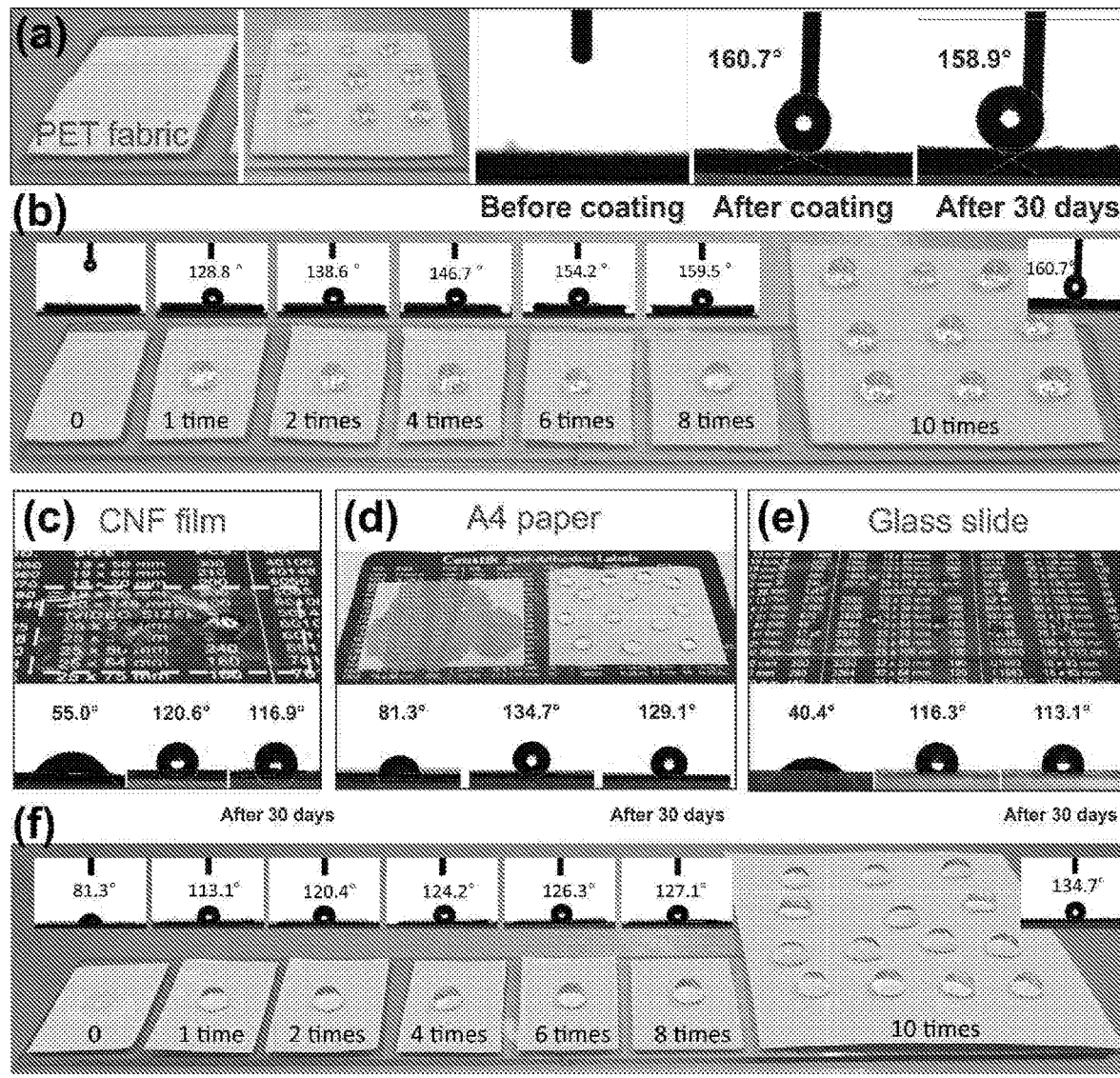
FIG. 4 shows: (a) change of contact angles of PET fabric before and after coating by HCOENPs; (b) dependence of contact angles of PET fabric on different number of coating by HCOENPs; (c-e) waterproof effect and stability of HCOENPs-coated on different substrates, including (c) cellulose nanofiber (CNF) film, (d) A4 paper, and (e) glass slide; (f) dependence of contact angles of A4 paper on different number of coating by HCOENPs.

Preparation of Waterproof Fabric:

PET fabric was illustrated to describe the preparation process of waterproof fabric. PET fabric (thickness of 260±20 µm and dimension of 3 cm×3 cm) was pretreated by stirring in a 1.0 mol L$^{-1}$ NaOH aqueous solution at 50° C. for 120 min to remove the impurities, followed by rinsing with deionized water to fully wipe off the residual alkali. The resultant dry PET fabric was sprayed with a HCOENPs ethanol suspension (2 mg mL$^{-1}$) for 6 to 10 times, then it was dried at 60° C. for 20 min to obtain the waterproof PET fabric. All the waterproof samples as shown in FIG. 4 were prepared by dip-coating, which is an effective way for fabric treatment to achieve a similar hydrophobicity.

Fabrication of Fabric-Based Water TEG:

Au electrode was prepared by depositing 20 nm of gold on the reverse side of the waterproof HCOENPs-coated fabric with dimensions (1.5 cm×1.5 cm). Then, a conductive fabric tape was connected outward to the Au electrode as leads for subsequent electrical measurement, this was further wrapped by scotch tape for waterproofing.

Fabrication of Encapsulated All-Fabric-Based Dual Mode TEG:

The fabrication process of all-fabric-based dual mode TEG starts from three different fabrics. First, a waterproof HCOENPs-coated PET fabric (thickness of 260±20 m and dimension of 10 cm×6 cm) was covered by an Au thin-coating (thickness of 20 nm and dimension of 1.5 cm×1.5 cm) that served as the electrodes for both water TEG and contact TEG and the Output 1 of the dual mode TEG. Then, another standard uncoated PET fabric as the negative material of contact TEG was covered on the top of deposited Au electrode.

On the other hand, a cotton fabric pretreated by NaOH as the positive material of the contact TEG was coated by an Au electrode (thickness of 20 nm and dimension of 1.5 cm×1.5 cm) and used for both the contact TEG and the Output 2 of dual mode TEG. An acrylic tape (3M, USA) was used as the spacer to maintain the gap distance about 2 mm between the PET fabric and cotton fabric. Finally, the waterproof PET fabric was tightened to encapsulate all other parts into an integrated all-fabric-based device.

Bacterial Growth and Counting: A colony of E. coli (ATCC #25922) was dispersed in 15 mL LB Broth (Merck Millipore) for the preparation of E. coli starter. It was incubated at 37° C. and shaken at 120 rpm for 6 h. LB Broth was used to dilute the E. coli starter to achieve 5×10$^7$ cells mL$^{-1}$ by the UV-vis absorbance reading (1650PC UV-vis spectrophotometer, Shimadzu, Kyoto, Japan) of 0.3 at a wavelength of 600 nm. To assess the antifouling properties, the specimens were cut into 1 cm by 1 cm and immersed and incubated in the E. coli inoculum at 37° C. for 16 h. After the incubation, it was rinsed thrice with sterilized ultrapure distilled water before scrapping off the E. coli biofilms from the specimens by using a sterilized cotton swab. Serial dilutions were carried out before performing the Plate Count Methods.

Characterization and Electrical Measurement:

FTIR measurement was performed on PerkinElmer Frontier to confirm the structure of HCOE. A field-emission SEM (JEOL 7600) was employed to reveal the size and shape of HCOENPs, and a nanoparticle analyzer (HORIBA, SZ-100) was used to further determine the size. Contact angle and sliding angle (relative velocity, 0.8 s$^{-1}$) were measured by a video-based optical contact angle measuring system (Dataphysics OCA15 Pro) with droplets of 6 µL. Air permeability was tested with a piece of fabric (20 cm$^2$) under 100 Pa differential pressure by a fully automatic permeability instrument (YG461E-III). Weight for HCOENPs was recorded by the AT21 balance scales comparator (Mettler Toledo). To measure the electric outputs of the TEGs, a mixed domain oscilloscope (Tektronix MDO3024) with 10 MS2 probe and a low-noise current preamplifier (Stanford Research System model SR570) were used. And probers (CASCADE MICROTECH/ALESSI REL 4800) were used to record the charge process of TEG for the capacitors. For the wristband experiments, informed signed consent was obtained from the subject.

Example 2. Results and Discussion

The preparation process of the waterproof fabric is schematically illustrated in FIG. 1. First, the HCOE was synthesized by grafting with the oleoyl chloride via esterification modification based on the MCC, the resultant HCOE was further transferred from weak polar solvent to the polar solvent to obtain the HCOENPs via nanoprecipitation. FIG. 2(a) shows the resultant modified cellulose with hydrophobic aliphatic chains which replace the original hydroxyl groups to achieve the hydrophobicity. FTIR result as shown in FIG. 2(b) was used to confirm the modification process. The strong peak at 3384.2 cm$^{-1}$ that belongs to the stretching vibration of —OH groups disappeared in the resultant samples of HCOENPs (curve iii). The resultant modified cellulose (curve iii) shows many new peaks that appear at 3007.9, 2929.6, 2851.4, 1751.8, 1653.8, 1169.2~1031.6, and 724.1 cm$^{-1}$, which are attributed to the group of CH=CH, —CH$_3$, —CH$_2$—, C=O, C=C, C—O, and —(CH$_2$)—, respectively. It is clear that the appearance of these new groups comes from the oleoyl chains (compared with curve ii). It indicates that the oleoyl chloride was successfully grafted onto the cellulose, giving the product named as HCOE.

Thereafter, the HCOENPs were prepared by nanoprecipitation via transferring the HCOE from a weak polar solvent to a polar solvent. SEM revealed that the optimized resultant HCOENPs are uniform in spheres with the sizes about 35±5 nm, which is reasonably slightly smaller than the result of size distribution (≈47 nm) (FIG. 2(e)). There is a distinct morphology change into spherical nanosized HCOENPs compared with the original micron-sized MCC (FIG. 2(c-e)).

Subsequently, the ethanol suspension of HCOENPs (0.2 to 0.6 mg mL$^{-1}$) was sprayed on the superhydrophilic PET fabric with dosage of 1 mL cm$^{-2}$ to construct a quasi-monolayer nanoscale rough hydrophobic coating (FIG. 10(a-b)). The uncoated PET fabric is water permeable and could not withstand the impact of water (FIG. 10(d)). Owing to its intrinsic microscale weaved structure, the HCOENPs-coated fabric has a hierarchical micro/nano-surface structure that contains trapped air and effectively repels the penetration of water to achieve a super-waterproof textile (FIG. 10(d)). The inset of FIG. 10(d) presents the PET fabric showing a super-hydrophobicity with a high static contact angle (SCA, 162.1°) after sprayed by HCOENPs. Also, similar outcomes could be realized by dip-coating with HCOENPs suspension. FIG. 4(b) shows the SCA increased rapidly as the number of dip-coating times increased. It could achieve a super hydrophobic performance after six times dipping with HCOENPs. Even a ten times-dipped PET fabric still shows a high SCA of 158.9° after being left at room temperature for 30 days (FIG. 4(a)). The negligible decrease of the SCA compared with the initial 160.7° suggests the favorable stability of the HCOENPs coating in daily environment. Besides, it is shown that the HCOENPs could be coated on different hydrophilic substrates in FIG. 4(c-e), such as cellulose nanofiber film, A4 paper, and glass slide to realize their hydrophobicity. An A4 paper presented satisfactory hydrophobicity after several times of dip-coating (FIG. 10(f)). It indicates that HCOENPs is a general strategy to realize waterproof spray on a myriad of substrates for extensive applications.

Figure 10:
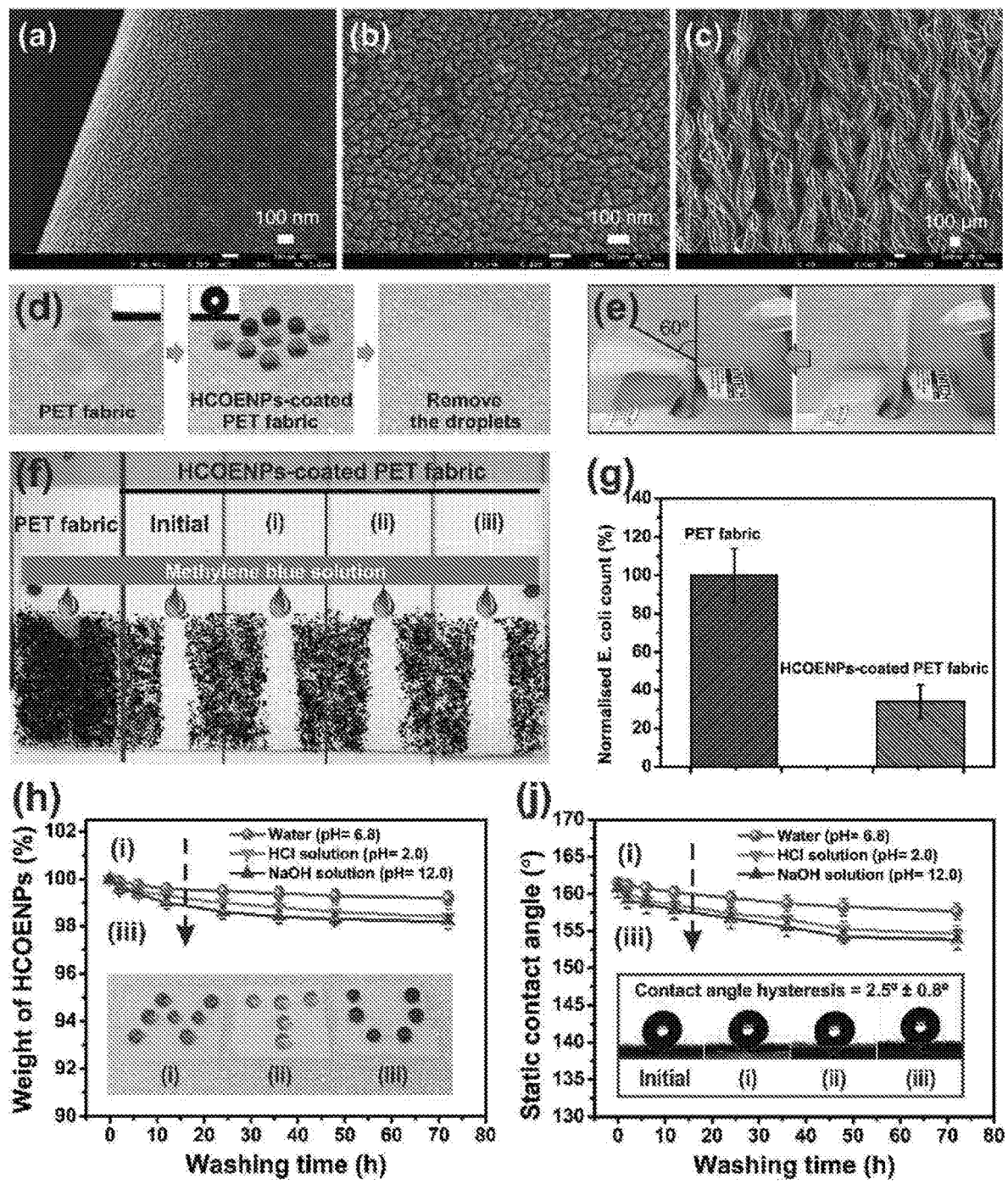
FIG. 10 shows a demonstration of the performance of HCOENPs-coated PET fabric of Example 2: (a,b) morphology of HCOENPs coated on the single fiber (scale bar, 100 nm); (c) the yarn structure of the HCOENPs-coated superfine PET fabric (scale bar, 100 μm); (d) photograph of water repellency of PET fabric before and after coating with HCOENPs. The insets are their static contact angle (SCA), respectively; (e) photograph of a piece of Kimwipes paper being blown by air stream (5 cm$^3$ s$^{-1}$) pass through HCOENPs-coated PET fabric from a syringe; (f) self-cleaning presentation for dust of a PET fabric before and after coating with HCOENPs; (g) quantified plate count of the accumulated bacteria (*E. coli*) adhered on a PET fabric before and after coating with HCOENPs; (h) the variation in weight percentage of the HCOENPs coated on PET fabric as a function of washing time in harsh environment. The inset is the photograph of HCOENPs-coated PET fabric that holds the dyes aqueous droplets after being washed for 72 h; (j) dependence of SCA of HCOENPs-coated PET fabric on the different washing time in harsh environment. The insets are the stable contact angle hysteresis (CAH) of HCOENPs-coated PET fabric. The error bar was obtained with ten sampling points. Washable tests in harsh environment stated here were performed in the neutral (i), acidic (ii), and alkaline (iii) solution of room temperature for 72 h, respectively.

FIG. 10(a-b) show a continuous thin coating of HCOENPs on the surface of a single fiber, and the yarn structures were retained well after the coating of HCOENPs on the superfine PET fabric, indicating that the HCOENPs coating did not block the fabric holes (FIG. 10(c)). Consequently, the fabric not only possessed a super-hydrophobicity property but also kept a favorable air permeability as shown in FIG. 10(e), in which a piece of Kimwipes paper is being blown by air stream (5 cm$^3$ s$^{-1}$) from a syringe. A quantitative measurement of air permeability confirms that HCOENPs-coated PET fabric possesses a very high air permeability of 1928±2 L m$^{-2}$ s$^{-1}$ which is almost unaffected by the HCOENPs coating when compared with the uncoated PET fabric (1935±3 L m$^{-2}$ s$^{-1}$). It is therefore convincing to ensure the comfort for related wearable devices. Besides, self-cleaning and antifouling performance are the other two crucial requirements to achieve the long term application of our waterproof fabric-based TEG in a harsh environment. To this end, contact angle hysteresis (CAH) and sliding angle (SA) were tested as shown in the Table 1, which confirmed that the present waterproof PET fabric possesses a remarkable self-cleaning feature owing to its small CAH of 2.5°+0.8° and a small SA of 7°±1.6°.

TABLE 1

Static contact angle, advancing contact angle, receding contact, contact angle hysteresis and sliding angle of HCOENPs-coated PET fabric.

| Samples | PET fabric | HCOENPs-coated PET fabric | Washed by water for 72 h (pH = 6.8) | Washed by HCl solution for 72 h (pH = 2.0) | Washed by NaOH solution for 72 h (pH = 12.0) |
|---|---|---|---|---|---|
| Static contact angle (°) | <5 | 162.1 ± 0.8 | 158.2 ± 1.0 | 154.6 ± 1.2 | 153.8 ± 1.8 |
| Advancing contact angle (°) | — | 163.8 ± 1.0 | 159.8 ± 0.9 | 156.3 ± 1.5 | 155.7 ± 1.5 |
| Receding contact angle (°) | — | 161.3 ± 1.2 | 157.9 ± 0.8 | 154.2 ± 1.0 | 153.2 ± 1.5 |
| Contact angle Hysteresis (°) | — | 2.5 ± 0.8 | 1.9 ± 0.6 | 2.1 ± 0.7 | 2.5 ± 0.7 |
| Sliding angle (°) | — | 6 ± 1.5 | 6 ± 1.8 | 7 ± 1.2 | 7 ± 1.6 |

Accordingly, FIG. 10(f) shows the self-cleaning performance of the waterproof PET fabric against dust (simulated by carbon powder, ≈20 μm) and dye solution, of which the methylene blue solution was used to flush the dust that covered the PET fabric before and after coating by HCOENPs.

Figure 11:
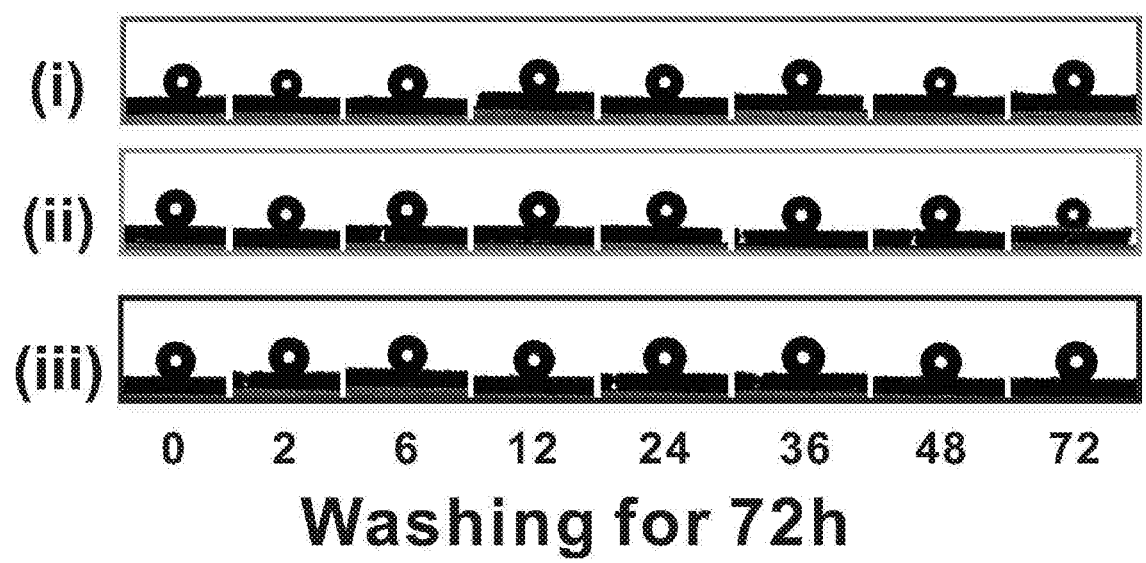
FIG. 11 shows the dependence of static contact angle of HCOENPs-coated PET fabric on the different washing time in neutral (i), acidic (ii) and alkaline (iii) harsh environments according to Example 2.

As a result, the PET fabric without HCOENPs coating showed super-hydrophilicity and adsorbed the methylene blue solution fleetly, leading to severe contamination by the methylene blue and the dust. On the contrary, dust could be washed away by the methylene blue droplets on the waterproof HCOENPs-coated PET fabric, and did not stay or get adsorbed on the fabric surface, showing an effective self-cleaning ability for both dust and organic dye (FIG. 10(f)). More interestingly, the waterproof PET fabric exhibited a considerable anti-biofouling property as shown in FIG. 10(g). It effectively resisted the adhesion and proliferation of E. coli to a low adhesion rate about 34.6±9.6%, which is much lower compared with pristine PET fabric (100±14%). In addition, the waterproof PET fabric was tested using high-speed stirring (600 rpm) in neutral, acidic, and alkaline aqueous solutions at room temperature, respectively, followed by monitoring the weight of HCOENPs and the SCA of waterproof PET fabric in real time. As shown in FIG. 10(h), a quantitative measurement by accurately weighing the HCOENPs after severe washing of HCOENPs-coated PET fabric for 72 h in the harsh environment was carried out. HCOENPs coating (0.35 mg cm$^{-2}$) on a PET fabric (3 cm×3 cm) maintained a highly consistent weight (>98.2%) after 72 h of accelerated severe washing. The resultant fabrics could stably hold the dyes aqueous solution droplets. Furthermore, FIG. 10(d) shows that the PET fabric was easily wetted by the dyes aqueous solution, in contrary, the HCOENPs-coated PET fabric shows an excellent resistance to the dyes and water, giving an initial SCA about 162.1° as shown in FIG. 10(j), before it slightly decreased to 157.6°, 154.6 0, and 153.8° after being stirred in water (pH=6.8), hydrochloric acid (HCl) solution (pH=2.0), and NaOH solution (pH=12.0) for 72 h, respectively. A set of typical photographs of the monitored SCA in real time are shown in FIG. 11. The waterproof performance of HCOENPs-coated PET fabric shows the best stability in neutral water and the lowest stability in alkaline solution. Nevertheless, SCA of more than 150° can be preserved after 72 h stirring. A stable CAH of 2.5° 0.8° (the insets of FIG. 10(j)) and a small SA of 7°±1.6° (Table 1) could be achieved, which also validated its stable self-cleaning abilities as shown in FIG. 10(f-i-iii).

This indicates that the resultant PET fabric was able to retain its super-hydrophobicity in both neutral, and severe acidic or alkaline environment. It is herein demonstrated that the present environmentally friendly HCOENPs-coated PET fabrics have an impressive waterproof stability to satisfy the application demand in harsh environments.

Figure 5:
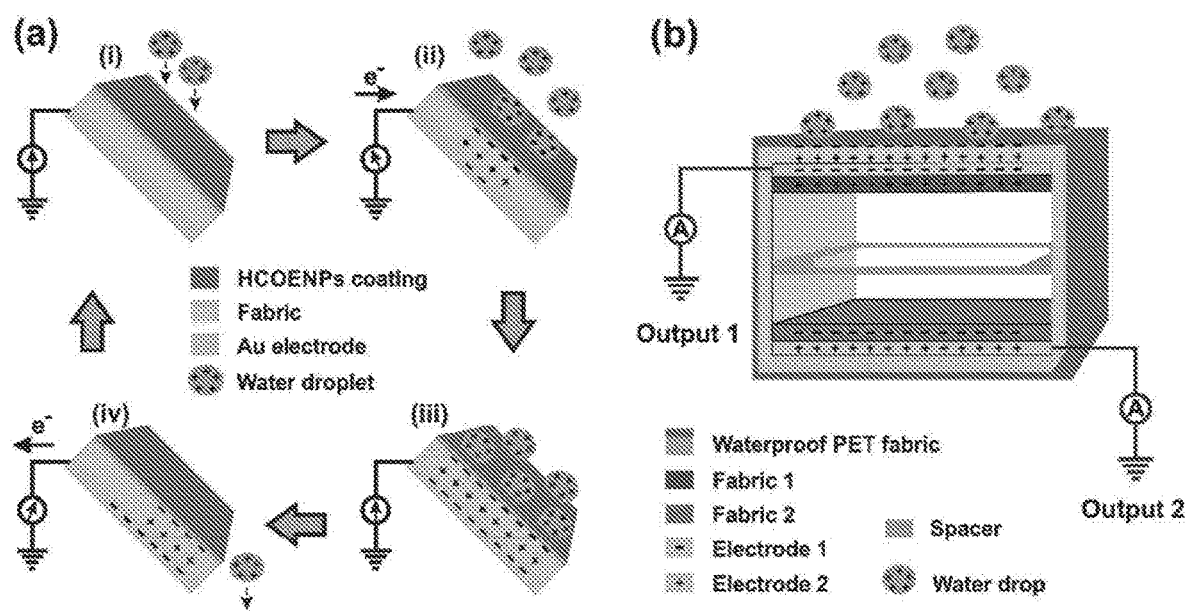
FIG. 5 shows: (a) working mechanism of the water-TEG when the generated triboelectricity is dominated by the contact electrification process with the pipes or air; (b) schematic illustration of the structure of all-fabric-based dual-mode TEG.

On the basis of above results, HCOENPs-coated PET fabric was employed to fabricate the WTEG as shown in FIG. 5(a). Previous studies indicated that the working mechanism of the water TEG is based on the triboelectricity created from the contact electrification process between water and air/tubings or with the surface of water TEG. Thus, discussion of the generated triboelectricity of present water TEG is based on both working mechanisms. The operation of the water TEG is explained as a single electrode mode. Water droplets often gain positive charges accumulated from air or by contact with silicone tubings, that leads to negatively charged HCOENP-coated fabric at the water interface and electrical double layer (EDL) formation occurs within the fabric (FIG. 5(a-i,-ii)). Otherwise, when water droplet falls directly and first comes into contact with the HCOENPs-coated fabric, the ionization of surface groups on waterproof fabric also causes it to be negatively charged and produces the EDL at the fabric interface. Both these EDL formed within the fabric will cause the accumulation of charges at the Au electrode, leading to a positive electric potential difference established between the charged droplets and ground, leading to the transfer of electrons from ground to the Au electrode in order to balance the potential difference and reach equilibrium (FIG. 5(a-iii)). This process generates an instantaneous positive current. Once the water droplet leaves the waterproof fabric, a negative electric potential difference is created, leading to electrons flow from the Au electrode to ground (FIG. 5(a-iv)) until a new equilibrium is attained. This process generates an instantaneous negative current. With subsequent water contacting the waterproof fabric periodically, an alternating current output can be continuously generated. For this process, the durable super-hydrophobicity of fabric contributes in achieving the maximum electrical output owing to the quick and thorough departure of each water droplet.

Figure 6:
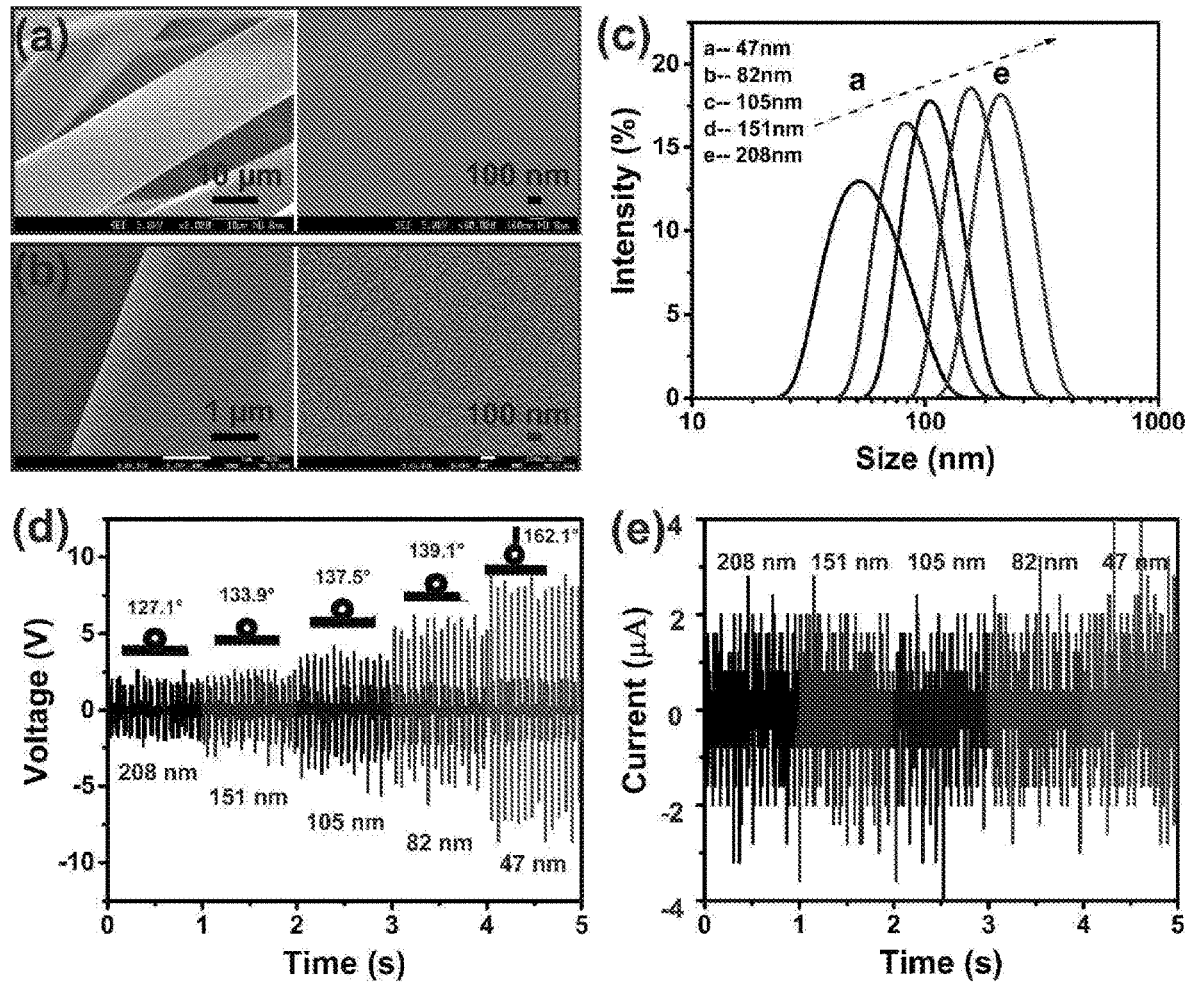
FIG. 6 shows: (a-b) comparison of morphologies of the fabrics being coated with different sizes of HCOENPs; (c) size distribution of HCOENPs with different sizes; (d) output voltages of PET fabric coated by different sizes of HCOENPs; (e) output currents of PET fabric coated by different sizes of HCOENPs.
Figure 12:
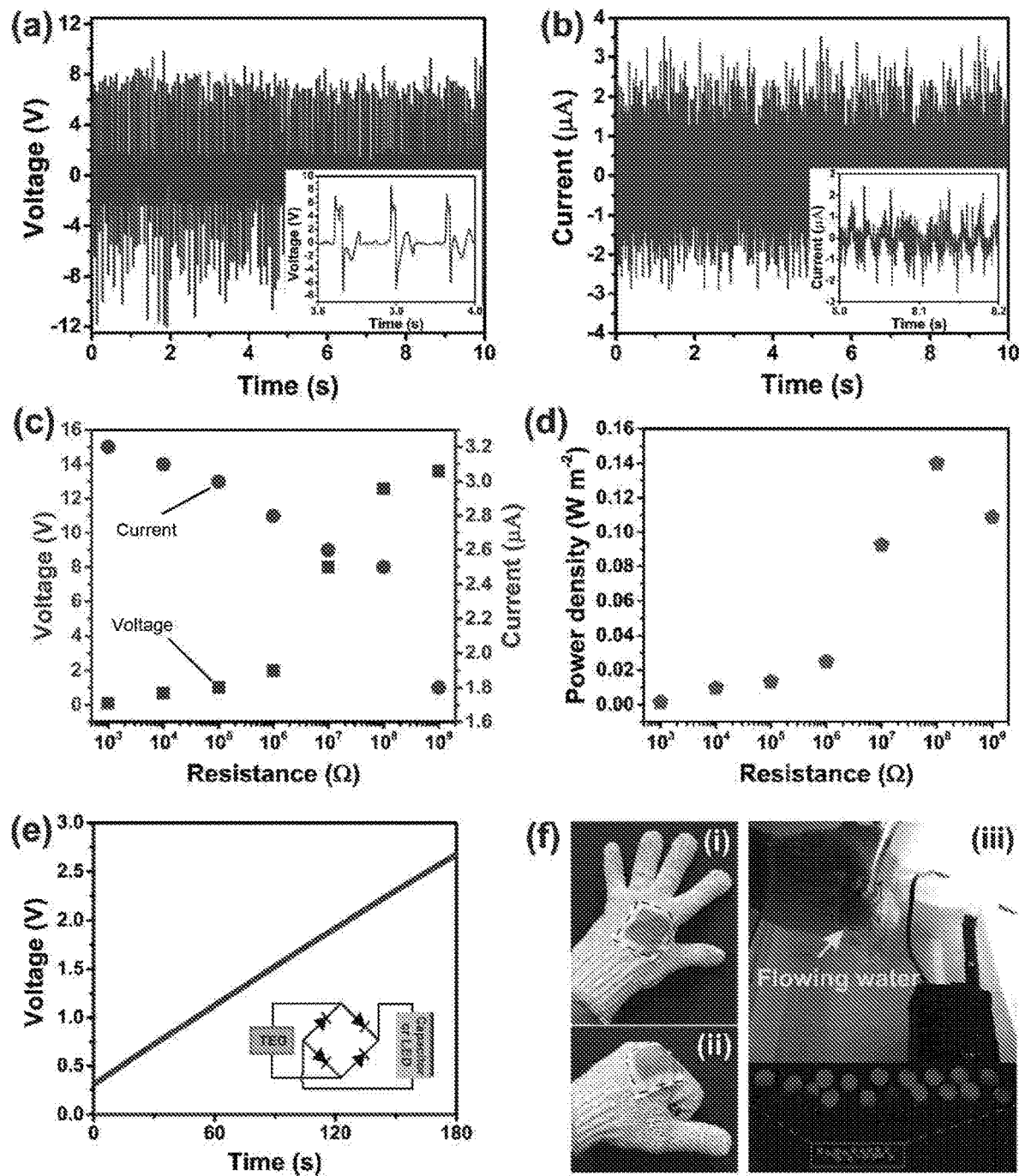
FIG. 12 shows electrical outputs of PET fabric-based water TEG: (a) output voltage and (b) output current of PET fabric-based water TEG. The flowing rate of water was 6 mL s$^{-1}$, and the distance between water TEG and the outlet of pipe was 10 cm. The insets are their magnified signals, respectively; (c,d) dependence of output voltage, output current, instantaneous power density of PET fabric-based water TEG on the resistance of external load; (e) charging curve of 10 μF capacitor by the PET fabric-based water TEG; (f) PET fabric-based water TEG was flexibly incorporated into a cotton glove (i and ii) for normally harvesting water energy to drive the commercial LEDs (iii). PET fabric-based water TEG with effective dimensions of 1.5 cm·1.5 cm was used here for output tests, effective dimensions of 3 cm·3 cm operated here for driving LEDs.

To measure the output of PET fabric-based water TEG, untreated tap water through the silicone tubing controlled by a water pump at a flowing rate of 6 mL s$^{-1}$ was used to provide impact on the water TEG at 45° and at a distance of 10 cm. As shown in FIG. 6, HCOENPs with size distribution increased from about 30 to 500 nm can be obtained by gradually increasing the concentration of HCOE (FIG. 6(c)). HCOENPs size increases with an increase in the HCOE concentration and a reduction in the stirring speed. Different sizes of HCOENPs were coated on the PET fabric to fabricate a series of water TEGs. Similar output currents were measured from these water TEGs as shown in FIG. 6(e), which is due to the undifferentiated electrons transfer rate of the same substrate. FIG. 6(d) shows these water TEGs have gradually increased output voltages as the size of coated HCOENPs reduced. It suggests that smaller HCOENPs coating makes the PET fabric more hydrophobic. A super hydrophobic PET fabric can be achieved with the smallest HCOENPs (see insets of FIG. 6(d)). As a result, the water droplet quickly leaves the fabric surface to make the charge transfer as completely as possible. Thus, the smallest HCOENPs with size about 35±5 nm (or about 47 nm measured using nanoparticle analyzer) were employed as optimized coating to realize the PET fabric-based water TEG. Accordingly, FIG. 12(a,b) show the output voltage and current reach 15 V and 4 μA, respectively. Some fluctuation of the electric output (the insets of FIG. 12(a,b)) suggests that not all the droplets which fall randomly on the water TEG surface can reach or leave the fabrics simultaneously. The positive voltage peak is almost equal to the negative voltage peak, but more stable than the negative voltage peak, indicating that the pre-charged water droplets by air/tubes have contributed to the outputs (FIG. 5(a)). Following the proposed working mechanism, the positive and negative current peaks correspond to the processes of the contact and departure of the positively charged water droplets on the water TEG surface, respectively. From the inset of FIG. 12(b), the positive current peak is equal to the negative current peak, suggesting that the water droplets are removed from the water TEG surface fleetly that is similar with the falling contact process. It confirms that the present water TEG can effectively harvest the electrostatic energy of water. Moreover, the generated voltage and current with external load resistor was measured to investigate the output power density of PET fabric-based water TEG. As shown in FIG. 12(c), the output voltage increases from 0.1 to 13.6 V as the load resistance increased from 0.001 MΩ to 1 GΩ, the current across the load followed a reversed trend decreasing from 3.2 to 1.8 μA. The instantaneous power density created from PET fabric-based water TEG is small when the resistance is below 1 MΩ, and achieved the maximum values of 0.14 mW m$^{-2}$ at a load of 100 MΩ (FIG. 12(d)). To demonstrate the application of the PET fabric-based water TEG, the alternating current output of PET fabric-based water TEG was easily converted to the direct current output via a full-wave rectifying bridge (the inset of FIG. 12(e)), and could be used to charge the 10 μF capacitor to 2.7 V in 180 s (FIG. 12(e)). More significantly, present PET fabric-based water TEG was woven into the cotton glove and could light up the commercial LEDs as exhibited in FIG. 12(f), showing a favorable flexibility and deformability without affecting its performance, and qualifying it to be a promising energy harvesting device for the wearable self-powered systems.

Figure 7:
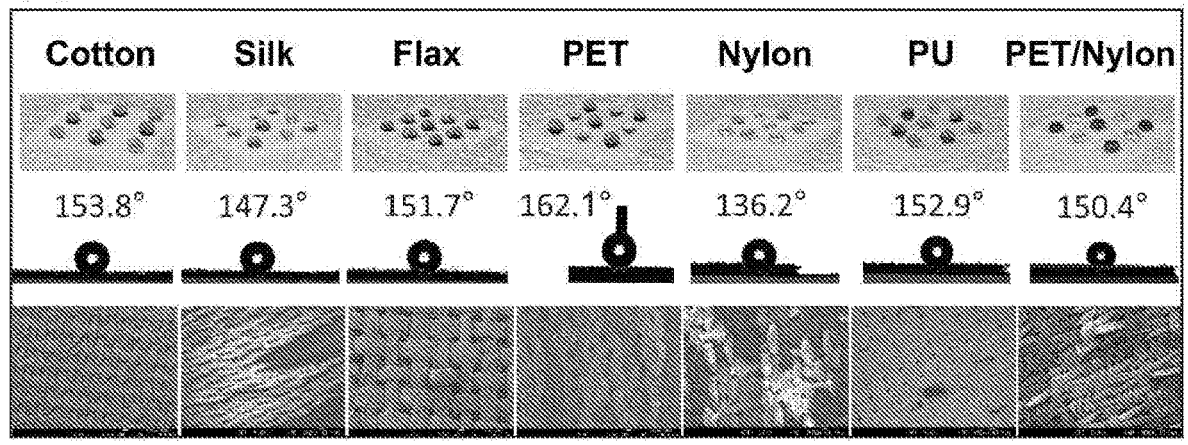
FIG. 7 shows: a) morphologies and hydrophobicity of different daily fabrics or textiles being coated by HCOENPs; (b) output voltages of different waterproof fabrics or textiles; (c) output currents of different waterproof fabrics or textiles.
Figure 7:
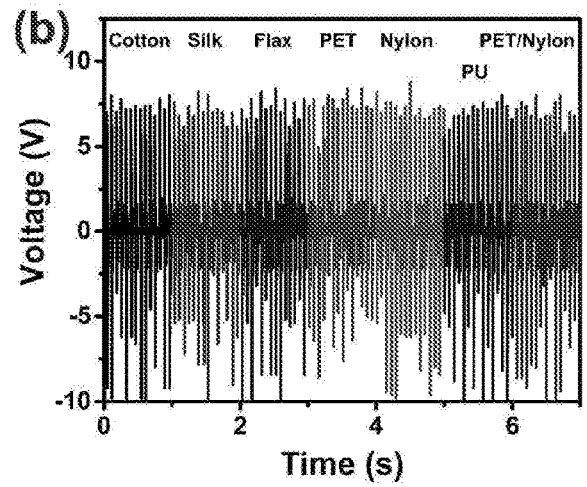
Figure 7:
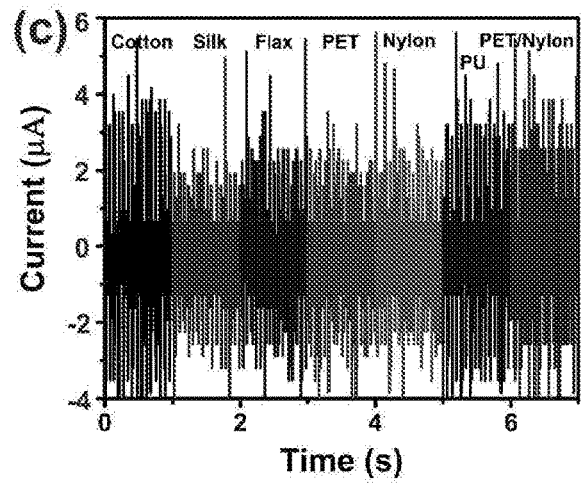

In order to make the devices more adaptable to the actual need of daily life, some other natural fabrics and synthetic fabrics were made into water TEG. As shown in FIG. 7, a series of fabrics include cotton, silk, flax, PET, nylon, PU, and blended fabric of PET/nylon were treated by HCOENPs to fabricate the water TEG. The morphologies of all the waterproof fabrics were shown in FIG. 7(a), all of them possess obvious repellence to the dyes aqueous solution. The SCA have slight differences due to the varying weaving patterns and distinct chemical compositions. For these different fabric-based water TEGs, their outputs in the same condition were measured. As a result, the TEGs have similar output voltages (FIG. 7(b)), but show slightly different output current (FIG. 7(c)). These results validate the working mechanism proposed in FIG. 5(a). The slight differences of hydrophobicity and dielectric constant of different fabrics would affect the inductively transferred charges on the Au electrode, which resulted in output differences of the water TEG. In short, various daily fabrics can be functionalized by HCOENPs for harvesting water energy. Especially, devices on the cotton, silk, and flax fabrics provide us with promising wearable water energy harvesters.

Figure 13:
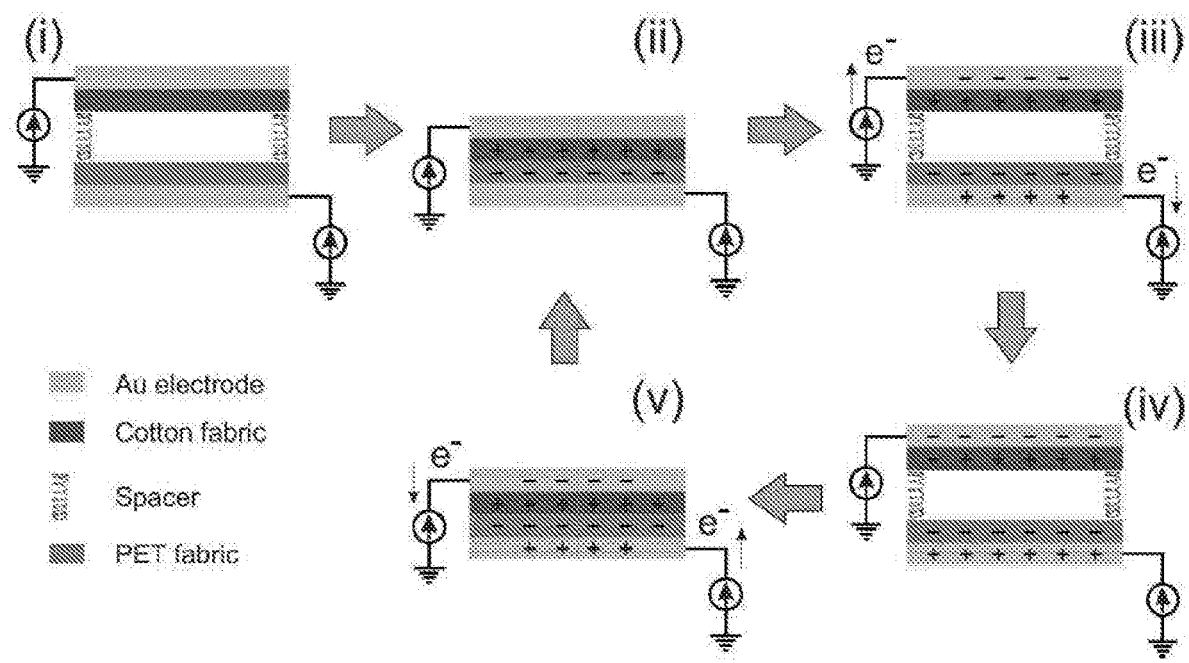
FIG. 13 shows a schematic illustrations of the structure and the working mechanisms of contact TEG.
Figure 14:
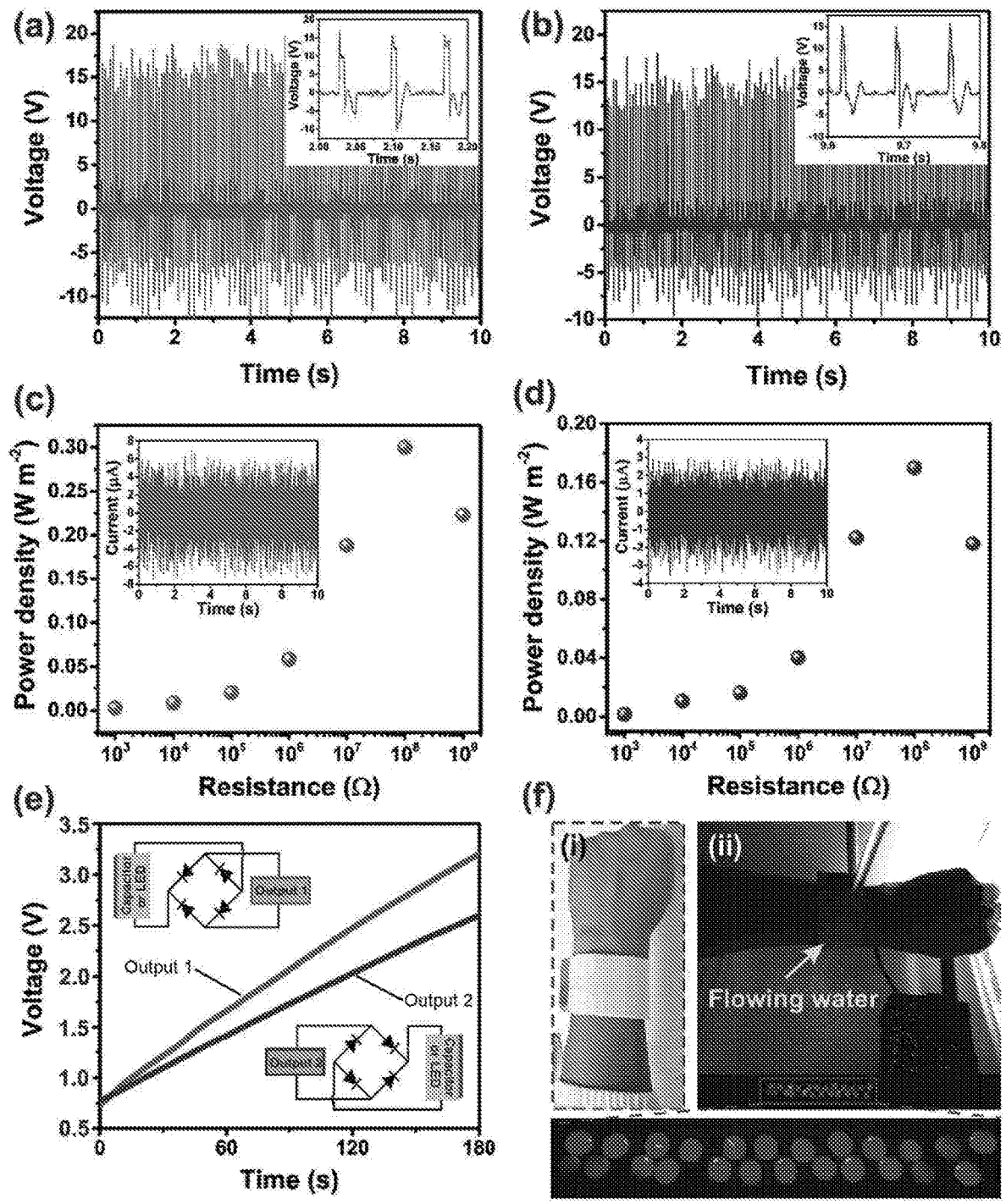
FIG. 14 shows electrical outputs of all-fabric-based dual mode TEG according to Example 2: (a,b) output voltages from Output 1 and Output 2 of the all-fabric-based dual mode TEG. The insets are the magnified signals of output voltage; (c,d) instantaneous power density generated from Output 1 and Output 2 of the all-fabric-based dual mode TEG with external resistance. The insets are the output currents of Output 1 and Output 2 without external resistance, respectively. The flowing rate of water was 10 mL s$^{-1}$, and the distance between the WTEG and the outlet of pipe was 10 cm; (e) charging curve of 16 μF capacitor by the all-fabric-based dual mode TEG; (f) all-fabric-based dual mode TEG was constructed as a wristband (i), it flexibly matches hand for harvesting water energy to drive the commercial LEDs (ii). All-fabric-based water TEG with effective dimensions of 1.5 cm·1.5 cm used here for output tests; effective dimensions of 3 cm·3 cm operated here for driving LEDs.

So far, the above fabric-based water TEG can effectively harvest the electrostatic energy of water. However, the flowing water not only produces the triboelectricity but also carries the mechanical energy. To this end, an all-fabric-based dual mode TEG that combined the configuration of a water TEG and a contact TEG as shown in FIG. 5(b) was fabricated. The PET fabric (negative material) and cotton fabric (positive material) were used for the configuration of contact TEG to collect the mechanical energy of water, and it was packaged by a waterproof PET fabric-based water TEG, which not only protects the contact TEG from wetting by water but also harvests the electrostatic energy of water. The working mechanism of dual mode TEG can be explained as a single electrode mode based on two separate water TEG and contact TEG. The operation process of water TEG was illustrated in FIG. 5(a). Meanwhile, the impact force of water will make the cotton fabric and PET fabric repeatedly contact and separate to drive the operation of contact TEG. As shown in FIG. 5(b), the Au electrode 1 was used to collect the triboelectricity (Output 1) generated from both water TEG and contact TEG, the Au electrode 2 was used to collect another output of contact TEG. More specifically, in the working process of all-fabric-based dual mode TEG, both water droplet and cotton fabric will simultaneously possess the same generated charges, the induced charges were kept at the same directional flowing between Au electrode 1 and ground. Accordingly, the working mechanism of Au electrode 2 was easy to understand as it depends on the water-driven contact and separation of contact TEG. Therefore, if the charged water droplet or flowing water contacts and leaves the dual mode TEG periodically, both the outputs of water TEG and contact TEG will be continuously generated. The detailed working mechanism of all-fabric-based dual mode TEG can be appreciated in FIG. 5 and FIG. 13. The performance of dual mode TEG was measured based on a controlled tap water at flowing rate of 10 mL s$^{-1}$, the impact distance was 10 cm and the impact angle was 45°. As shown in FIG. 14(a,b), the voltage values of Output 1 (FIG. 14(a)) and Output 2 (FIG. 14(b)) reach 22 and 17.5 V, respectively, and current values of Output 1 (FIG. 14(c)) and Output 2 (FIG. 14(d)) achieve 8 and 4 µA, respectively (see insets of FIG. 14(c,d)).

Accordingly, the instantaneous power density generated from Output 1 (FIG. 14(c)) and Output 2 (FIG. 14(d)) of the all-fabric based dual mode TEG were 0.30 and 0.17 W m$^2$ at a load resistance of 100 MΩ. As a result, the values of Output 1 were enhanced obviously compared with the above-mentioned PET fabric based water TEG, owing to the higher density of inductively transferred charges on the Au electrode 1. It was also indicated by the distinct signals within 0.2 s as shown in the insets of FIG. 14(a,b), suggesting that the working mechanism of Output 1 was reliably enhanced by water TEG and contact TEG synergistically. The application potential of all-fabric-based dual mode TEG was further confirmed by charging the capacitors via a full-wave rectifying bridge as shown in the insets of FIG. 14(e). The results indicate that a 16 µF capacitor can be charged to 3.2 and 2.7 V by the Output 1 and Output 2 in 180 s$^{-1}$, respectively (FIG. 14(e)). Moreover, a demo as shown in FIG. 14(f), present dual mode TEG was constructed into a wristband to harvest water energy for driving the commercial LEDs. The excellent deformability of the wearable all-fabric constructed wristband makes it completely conform to hand wrist to perform expected tasks of water energy harvesting. It provides an attractive concept to realize energy harvesting device for wearable self-powered systems.

By "comprising" it is meant including, but not limited to, whatever follows the word "comprising". Thus, use of the term "comprising" indicates that the listed elements are required or mandatory, but that other elements are optional and may or may not be present.

By "consisting of" is meant including, and limited to, whatever follows the phrase "consisting of". Thus, the phrase "consisting of" indicates that the listed elements are required or mandatory, and that no other elements may be present.

The inventions illustratively described herein may suitably be practised in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

By "about" in relation to a given numerical value, such as for temperature and period of time, it is meant to include numerical values within 10% of the specified value.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

The invention claimed is:

1. A wearable water triboelectric generator comprising:
   a substrate having a first surface and a second surface, wherein the first surface and the second surface are opposing to each other; and
   an electrode positioned on the second surface,
   wherein the first surface comprises a modified hydrophobic surface comprising a coating of hydrophobic cellulose oleoyl ester nanoparticles, and
   wherein the substrate comprises openings and remains breathable.

2. The wearable water triboelectric generator of claim 1, wherein the hydrophobic cellulose oleoyl ester nanoparticles comprise nanoparticles of a cellulose molecule grafted with oleoyl ester functional groups.

3. The wearable water triboelectric generator of claim 1, wherein the substrate comprises a fabric, a cellulose nanofiber film, paper, or glass.

4. The wearable water triboelectric generator of claim 3, wherein the fabric comprises cotton fabric, silk fabric, flax fabric, polyethylene terephthalate fabric, polyurethane fabric, nylon, and polyethylene terephthalate/polyurethane fabric, polyethylene terephthalate/nylon fabric, or a micro/nano-fiber membrane selected from the group consisting of polyvinyl alcohol, polyvinylpyrrolidone, polyacrylonitrile, polyimide, polyvinylidene fluoride, poly(vinylidenefluoride-hexafluoropropylene), poly(vinylidenefluoride-co-trifluoroethylene), poly(vinylidene fluoride-co-chlorotrifluoroethylene), and poly(vinylidene fluoride-co-chlorotrifluoroethylene-co-chlorofluoroethylene), or a combination thereof.

5. A method for forming a wearable water triboelectric generator, the method comprising:
providing a substrate, wherein the substrate comprises a first surface and a second surface, wherein the first surface and the second surface are opposing to each other;
coating a suspension comprising hydrophobic cellulose oleoyl ester nanoparticles onto the first surface of the substrate, thereby forming a coating of hydrophobic cellulose oleoyl ester nanoparticles on the first surface of the substrate;
drying the substrate; and
coating an electrode on the second surface of the substrate,
wherein the substrate comprises openings and remains breathable.

6. The method of claim 5, wherein the substrate comprises a fabric, a cellulose nanofiber film, paper, or glass.

7. The method of claim 6, wherein the substrate comprises a fabric and the method further comprises contacting the substrate with an alkaline aqueous solution to form a pretreated substrate prior to the coating step.

8. The method of claim 7, wherein the substrate is contacted with the alkaline aqueous solution at 20 to 100° C.

9. The method of claim 7, wherein the substrate is contacted with the alkaline aqueous solution for 10 to 120 min.

10. The method of claim 5, wherein the suspension comprises 0.001 to 20 wt % of hydrophobic cellulose oleoyl ester nanoparticles.

11. A wearable dual mode water and contact triboelectric generator comprising:
a water triboelectric generator, wherein the water triboelectric generator comprises a first substrate having a first surface and a second surface, wherein the first surface and the second surface are opposing to each other; and wherein the first surface comprises a modified hydrophobic surface comprising a coating of hydrophobic cellulose oleoyl ester nanoparticles; and
a contact triboelectric generator, wherein the contact triboelectric generator comprises a second substrate having a third surface and a fourth surface, wherein the third surface and the fourth surface are opposing to each other,
the contact triboelectric generator further comprises a third substrate having a fifth surface and a sixth surface, wherein the fifth surface and the sixth surface are opposing to each other,
the contact triboelectric generator further comprises a spacer positioned between the second substrate and the third substrate such that the spacer is close to or in contact with the fourth surface of the second substrate and the fifth surface of the third substrate,
the contact triboelectric generator further comprises a first electrode coated on the third surface of the second substrate, and further comprises a second electrode coated on the sixth surface of the third substrate, such that the first electrode and the second electrode are opposing,
wherein the water triboelectric generator and the contact triboelectric generator are arranged such that the first substrate of the water triboelectric generator completely surrounds or encapsulates the contact triboelectric generator, and wherein the second surface of the first substrate contacts the first electrode and the second electrode of the contact triboelectric generator.

12. The wearable dual mode water and contact triboelectric generator of claim 11, wherein the hydrophobic cellulose oleoyl ester nanoparticles comprise nanoparticles of a cellulose molecule grafted with oleoyl ester functional groups.

13. The wearable dual mode water and contact triboelectric generator of claim 11, wherein the first, second, and third substrate each comprises a fabric, a cellulose nanofiber film, paper, or glass.

14. The wearable dual mode water and contact triboelectric generator of claim 13, wherein the first substrate comprises a fabric selected from the group consisting of cotton fabric, silk fabric, flax fabric, polyethylene terephthalate fabric, polyurethane fabric, nylon, and polyethylene terephthalate/polyurethane fabric, polyethylene terephthalate/nylon fabric, or a micro/nano-fiber membrane selected from the group consisting of polyvinyl alcohol, polyvinylpyrrolidone, polyacrylonitrile, polyimide, polyvinylidene fluoride, poly(vinylidenefluoride-hexafluoropropylene), poly(vinylidenefluoride-co-trifluoroethylene), poly(vinylidene fluoride-co-chlorotrifluoroethylene), and poly(vinylidene fluoride-co-chlorotrifluoroethylene-co-chlorofluoroethylene), or a combination thereof, with the proviso that the second and third substrates are not comprised of the same material.

15. The wearable dual mode water and contact triboelectric generator of claim 11, wherein the spacer comprises an insulating elastic material or a polymer elastomer.

16. A method for forming a wearable dual mode water and contact triboelectric generator of claim 11, the method comprising:
providing a first substrate, wherein the first substrate comprises a first surface and a second surface, wherein the first surface and the second surface are opposing to each other;
coating a suspension comprising hydrophobic cellulose oleoyl ester nanoparticles onto the first surface of the first substrate to obtain a treated first substrate;
drying the treated first substrate;
providing a second substrate having a third surface and a fourth surface, wherein the third surface and the fourth surface are opposing to each other, wherein a first electrode is coated on the third surface of the second substrate;
providing a third substrate having a fifth surface and a sixth surface, wherein the fifth surface and the sixth surface are opposing to each other, wherein a second electrode is coated on the sixth surface of the third substrate, such that the first electrode and the second electrode are opposing;
positioning a spacer between the second substrate and the third substrate such that the spacer is close to or in contact with the fourth surface of the second substrate and the fifth surface of the third substrate; and
arranging the treated first substrate such that the treated first substrate completely surrounds or encapsulates the second substrate and the third substrate, wherein the second surface of the treated first substrate contacts the first electrode and the second electrode of the second substrate and the third substrate, respectively.

17. The method of claim 16, wherein the first, second, and third substrate each comprises a fabric, a cellulose nanofiber film, paper, or glass.

18. The method of claim 17, wherein the first substrate comprises a fabric and the method further comprises contacting the first substrate with an alkaline aqueous solution to form a pre-treated first substrate prior to the coating step.

19. The method of claim 18, wherein the first substrate is contacted with the alkaline aqueous solution at 20 to 100° C.

20. The method of claim 18, wherein the first substrate is contacted with the alkaline aqueous solution for 10 to 120 min.

21. The method of claim 16, wherein the suspension comprises 0.001 to 20 wt % of hydrophobic cellulose oleoyl ester nanoparticles.

* * * * *